(12) United States Patent
Plant et al.

(10) Patent No.: US 11,890,813 B2
(45) Date of Patent: Feb. 6, 2024

(54) ANATOMICAL PROTECTIVE ITEMS

(71) Applicant: Rheon Labs Limited, London (GB)

(72) Inventors: Daniel James Plant, London (GB); Olga Grossman, London (GB)

(73) Assignee: RHEON LABS LIMITED, London (GB)

( * ) Notice: Subject to any disclaimer, the term of this patent is extended or adjusted under 35 U.S.C. 154(b) by 1008 days.

(21) Appl. No.: 16/810,440

(22) Filed: Mar. 5, 2020

(65) Prior Publication Data
US 2020/0282655 A1    Sep. 10, 2020

(30) Foreign Application Priority Data

Mar. 6, 2019 (GB) .................................. 1903019

(51) Int. Cl.
*B33Y 10/00* (2015.01)
*B29C 64/386* (2017.01)
(Continued)

(52) U.S. Cl.
CPC ............ *B29C 64/386* (2017.08); *A41D 13/05* (2013.01); *B33Y 10/00* (2014.12); *B33Y 30/00* (2014.12);
(Continued)

(58) Field of Classification Search
CPC .. B29C 64/386; A41D 13/05; A41D 13/0506; A41D 13/0512; A41D 13/015;
(Continued)

(56) References Cited

U.S. PATENT DOCUMENTS

2004/0178955 A1\* 9/2004 Menache .............. A63F 13/213
342/465
2017/0089779 A1\* 3/2017 Dantus ................... A61B 5/369
(Continued)

FOREIGN PATENT DOCUMENTS

CA          2797170 A1     6/2013
CN      106659261 A  *   5/2017  ............. A42B 3/227
(Continued)

OTHER PUBLICATIONS

Search Report for United Kingdom Patent Application No. GB1903019.6 dated Aug. 7, 2019, 4 pages.
(Continued)

*Primary Examiner* — Kandasamy Thangavelu
(74) *Attorney, Agent, or Firm* — Dinsmore & Shohl LLP

(57) ABSTRACT

Disclosed herein are methods, apparatus and computer program products for use in manufacturing an anatomical protective item for one or more users. Embodiments of anatomical protective items may comprise a single layer of energy controlling cells. Input data associated with one or more users is obtained. The obtained input data is processed to identify one or more energy controlling criteria for the anatomical protective item. A packing process is employed to generate each energy controlling cell in the single layer. Each energy controlling cell comprises one or more walls which extend from an upper surface of the single layer to a lower surface of the single layer. The packing process is performed at least on the basis of the identified one or more energy controlling criteria. The anatomical protective item comprising the single layer of energy controlling cells is manufactured.

22 Claims, 26 Drawing Sheets

(51) Int. Cl.
  *B33Y 30/00*  (2015.01)
  *B33Y 50/00*  (2015.01)
  *B33Y 80/00*  (2015.01)
  *A41D 13/05*  (2006.01)
  *B29L 31/48*  (2006.01)
  *B29L 31/00*  (2006.01)

(52) U.S. Cl.
  CPC ............. *B33Y 50/00* (2014.12); *B33Y 80/00* (2014.12); *A41D 13/0506* (2013.01); *A41D 13/0512* (2013.01); *B29L 2031/48* (2013.01); *B29L 2031/768* (2013.01)

(58) Field of Classification Search
  CPC .... A41D 13/0156; B33Y 10/00; B33Y 30/00; B33Y 50/00; B33Y 80/00; B29L 2031/48; B29L 2031/768; A43D 2200/60; A43D 1/02; F41C 23/08; A43B 1/0009; A43B 7/141; A43B 13/04; A43B 17/14; A43B 23/0215; A43B 23/028; A43B 13/188; F41H 1/02; A63B 71/08; A63B 71/1216; A63B 2071/1208; A63B 2102/24; A63B 2209/00; A63B 2225/096; A63B 2225/66; A63B 71/081; A42B 3/062; G06F 30/17; G06F 2111/16
  See application file for complete search history.

(56) References Cited

U.S. PATENT DOCUMENTS

2017/0176146 A1\* 6/2017 Böhringer ............ A62B 17/006
2018/0144410 A1\* 5/2018 Wyner ................. A41D 13/015
2018/0146933 A1\* 5/2018 Lerch ..................... A61B 6/032
2018/0253906 A1\* 9/2018 Tran ........................ A43B 3/34

FOREIGN PATENT DOCUMENTS

WO    WO 2014182599 A1 \* 11/2014 ............ A41D 20/00
WO    WO 2015103634 A2 \*  7/2015 ............ A42B 3/064
WO    WO 2017033022 A2 \*  3/2017 ............ B32B 5/06
WO    2018075108 A1       4/2018
WO    2018115874 A1       6/2018

OTHER PUBLICATIONS

Rheon Labs, social media post dated Nov. 23, 2018, accessed Jul. 31, 2019.

\* cited by examiner

ANATOMICAL PROTECTIVE ITEMS

CROSS-REFERENCE TO RELATED APPLICATIONS

This Application claims priority to United Kingdom Application No. GB 1903019.6, filed Mar. 6, 2019, the entire contents of which are incorporated herein by reference.

INTRODUCTION

Technical Field

The present disclosure relates to anatomical protective items. In particular, but not exclusively, the present disclosure relates to anatomical protective items comprising a single layer of energy controlling cells.

Background

Impact to and shear of the human body during accidents or repeated activity can result in deformation of bones and tissues beyond their failure limits. See Institute of Medicine (US) and National Research Council (US) Committee on Trauma Research, *Injury In America: A Continuing Public Health Problem*, Washington (DC): National Academies Press (US), 1985, 4, Injury Biomechanics Research and the Prevention of Impact Injury. This causes damage of anatomic structures or alteration in function.

Humans' tolerance to impact, whether direct or oblique, depends on anatomical structure and posture of the impacted area. See Plant, D J P, 2014, *The Optimisation of Flexible Impact-Protection Systems for Varying* Strain *Rates* and *Energies*, PhD, London: Imperial College London. Mechanical properties of bone and soft tissue are fundamentally different and their combined shape and thickness determines non-penetrating injury severity. See Nyman, Jeffry S et al., *Tissue-Level Mechanical Properties of Bone Contributing to Fracture Risk* Current osteoporosis reports vol. 14, 4 (2016): 138-50. Impacts in higher proximity to bones increase the risk of bone fractures which are a severe non-penetrating injury.

Impact intensity can be reduced by energy-absorbing structures and padding material. Many contemporary limb protectors use a combination of ethylene-vinyl acetate (EVA) or polyurethane (PU) foam and hard shell to cover a broad area of and around the part of the body being protected. A minimal protection zone is defined by focusing around a main joint or bone and covering morphologically and mechanically different adjacent bones and soft tissue. Known protectors apply uniform padding to the protection zone without consideration of anatomic structure, posture and different impact tolerances. Such an approach can often lead to protectors which cover incorrect areas or which provide unsuitable protection to other areas.

It is important to pass or exceed standards while keeping a protector light yet effective. Padding is often bulky and can limit a user's range of motion. Existing foam systems are often non-porous, and increase body temperature and discomfort. Known protectors typically have uniform thickness; in some known designs, thickness is reduced towards the edges for less bulky appearance. To increase breathability, and or increase energy absorption, some known protectors or parts thereof are perforated with uniform patterns that are mostly driven by stylistic choices.

It would therefore be desirable to provide improved protectors and methods for manufacturing improved protectors.

BRIEF SUMMARY

According to a first aspect of the present disclosure, there is provided a method of manufacturing an anatomical protective item for one or more users, the anatomical protective item comprising a single layer of energy controlling cells, the method comprising: obtaining input data associated with one or more users; processing the obtained input data to identify one or more energy controlling criteria for the anatomical protective item; employing a packing process to generate each energy controlling cell in the single layer, wherein each energy controlling cell comprises one or more walls which extend from an upper surface of the single layer to a lower surface of the single layer, wherein the packing process is performed at least on the basis of the identified one or more energy controlling criteria; and manufacturing the anatomical protective item comprising the single layer of energy controlling cells.

According to a second aspect of the present disclosure, there is provided apparatus for use in manufacturing an anatomical protective item for one or more users, the anatomical protective item comprising a single layer of energy controlling cells, the apparatus comprising: at least one processor; and at least one memory including computer program code, the at least one memory and the computer program code being configured to, with the at least one processor, cause the apparatus at least to: obtain input data associated with one or more users; process the obtained input data to identify one or more energy controlling criteria for the anatomical protective item; employ a packing process to generate each energy controlling cell in the single layer, wherein each energy controlling cell comprises one or more walls which extend from an upper surface of the single layer to a lower surface of the single layer, wherein the packing process is performed at least on the basis of the identified one or more energy controlling criteria; and manufacture the anatomical protective item comprising the single layer of energy controlling cells.

According to a third aspect of the present disclosure, there is provided a computer program product comprising a non-transitory computer-readable storage medium having computer readable instructions stored thereon, the computer-readable instructions being executable by a computerized device to cause the computerized device to perform a method of manufacturing an anatomical protective item for one or more users, the anatomical protective item comprising a single layer of energy controlling cells, the method comprising: obtaining input data associated with one or more users; processing the obtained input data to identify one or more energy controlling criteria for the anatomical protective item; employing a packing process to generate each energy controlling cell in the single layer, wherein each energy controlling cell comprises one or more walls which extend from an upper surface of the single layer to a lower surface of the single layer, wherein the packing process is performed at least on the basis of the identified one or more energy controlling criteria; and manufacturing the anatomical protective item comprising the single layer of energy controlling cells.

Features described in relation to one aspect or embodiment of the present disclosure may be incorporated into other aspects or embodiments of the present disclosure. For example, the method of one or more embodiments may incorporate any of the features described with reference to the apparatus of one or more embodiments and vice versa.

BRIEF DESCRIPTION OF THE DRAWINGS

Embodiments of the present disclosure will now be described by way of example only with reference to the accompanying drawings of which.

DETAILED DESCRIPTION

Figure 1A:
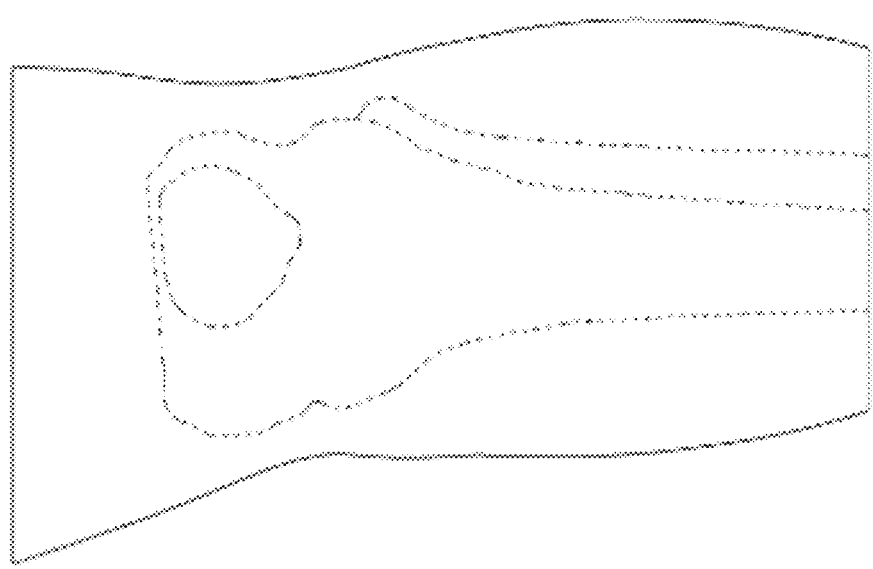
FIGS. 1A-1H show gathering of various input data according to embodiments.

Whilst the present disclosure has been described and illustrated with reference to particular embodiments, it will be appreciated by those of ordinary skill in the art that the disclosure lends itself to many different variations not specifically illustrated herein. By way of example only, certain possible variations will now be described.

Embodiments described herein relates to design of anatomical protective items. Embodiments can optimize the design and manufacture of protective garments, equipment and elements thereof in the field of sports, medical and military defense.

Embodiments described herein have been tested in many sporting applications such as motorcycles, athletics, football, shoes, gloves and cycling padding as well as medical applications such as hip protectors and military applications such as recoil protection. Embodiments are applicable in any protective item, wearable garment, equipment or element thereof.

Embodiments described herein involve accurate consideration of the exact location of a user's bones and their posture during any impact, whether direct or oblique, in protective garments and padding. Embodiments consider the morphological and mechanical difference between different bones and soft tissue.

The protective items of embodiments can be integrated into or replace parts of protective garments and padding. Embodiments improve impact protection whilst being thinner, lighter and more breathable, offering more comfort and range of motion.

In embodiments, the levels and type of protection can vary according to shape, mechanical properties and posture of impacted areas. This requires a higher resolution and analysis of the anatomical structure beneath the protective item(s). To achieve this resolution, measures, including methods, apparatus and computer programs and computer program products, for the design and manufacture of protective items system have been developed.

The protective items of embodiments are deliberate organization of cells (or "elements") in a grid or other tessellations in such a way that structural properties vary between different areas of the system. This makes embodiments useful when it is desired that part properties vary from one area to another. The variation can be achieved by clustering individual components or subtracting components from existing material in multiple axes, following a specific set of rules. Lattices and perforated sheets can be employed in embodiments. The cells are referred to as energy controlling cells because, in addition to energy absorption, they can also control energy in shear, tension and coefficient of restitution (e.g. damping).

In order to have viable additive manufacturing times, 3D printed lattices are typically made of open cells that are less optimized for impact. Therefore, a system made of a single layer according to embodiments provides more flexibility to vary geometries according to both anatomic structure and impact.

Embodiments involve dense packing and variation of tuned geometries in a protective material system within body armor or protective padding.

Embodiments involve obtaining detailed user data and modelling a single layer cell structure based on it. This facilitates design of features such as part outline and cell structure to control weight, surface area and thickness. Embodiments involve designing and manufacturing body armor protectors and pads. In embodiments, the parts are a sheet of material with varying thickness, packed or perforated with cells that vary in profile, size and/or orientation according to anatomic and other input data. Each cell has a unique diameter, height, axis and profile that can be tuned to performance. Embodiments involve use of computer software, for example in a computer aided design (CAD) and/or visual programming environment.

Embodiments comprise measures, including methods, apparatus and computer programs, for use in manufacturing an anatomical protective item for one or more users, the anatomical protective item comprising a single layer of energy controlling cells. Input data associated with one or more users is obtained. The obtained input data is processed to identify one or more energy controlling criteria for the anatomical protective item. A packing and/or tessellation process (or "algorithm" or "mechanism") is employed to generate each energy controlling cell in the single layer. Each energy controlling cell comprises one or more walls which extend from an upper surface of the single layer to a lower surface of the single layer. The packing and/or tessellation process is performed at least on the basis of the identified one or more energy controlling criteria. The anatomical protective item comprising the single layer of energy controlling cells is manufactured, for example using one or more of an injection molding process and an additive manufacturing process.

Embodiments can comprise three stages as follows: (1) Input Data; (2) Data Interpolation; and (3) Geometry construction.

Input Data

Embodiments of the input data stage involve gathering of input data associated with one or more users. This would typically be one or a combination of user anatomical information in particular but not limited to medical imaging, anthropometry, pressure mapping, motion tracking and digital image correlation. The data is analyzed to make measurements of anatomic structure in the impacted area. For example, the thickness of bone and soft tissue, the distance between bones and skin surface, posture during impact and how these relate to common direction of impact or injury places. In addition, the models allow analysis of user motion, fit and performance.

Embodiments involve obtaining user input data (for example anatomical information), in particular but not limited to medical imaging data, anthropometry data, pressure mapping data, motion tracking data and digital image correlation data. The data can be further simulated digitally to study motion, fit and performance.

FIG. 1A shows gathering of input data comprising 3D data or an image of a medical imaging scan including skin and/or bones of the body or parts thereof.

Figure 1B:
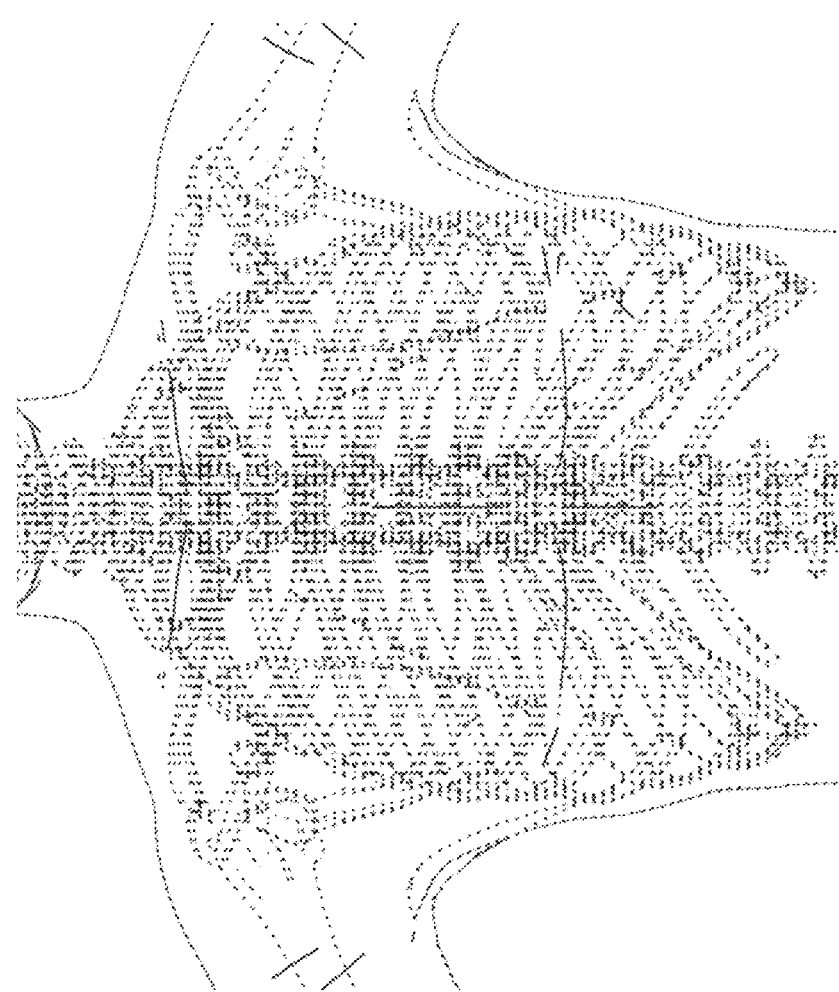

FIG. 1B shows gathering of input data comprising an individual scan for customization for a particular user.

Figure 1C:
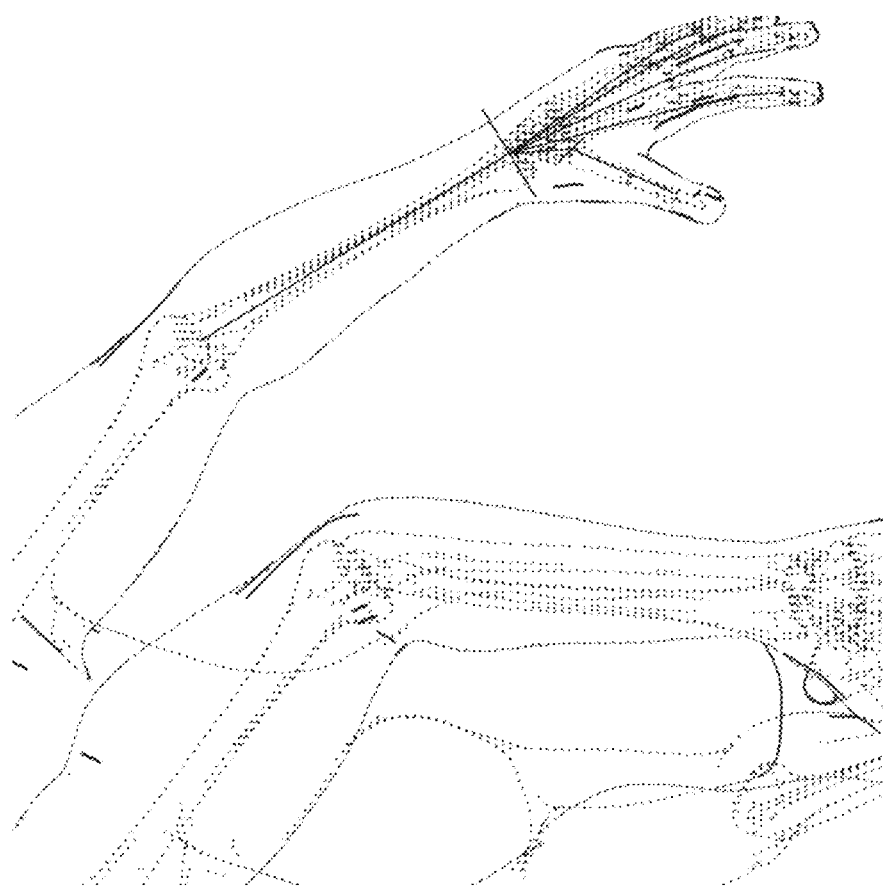

FIG. 1C shows gathering of input data comprising a scan and/or digital body rigging in a position/s that is prone to injury or common whilst using the protector.

Figure 1D:
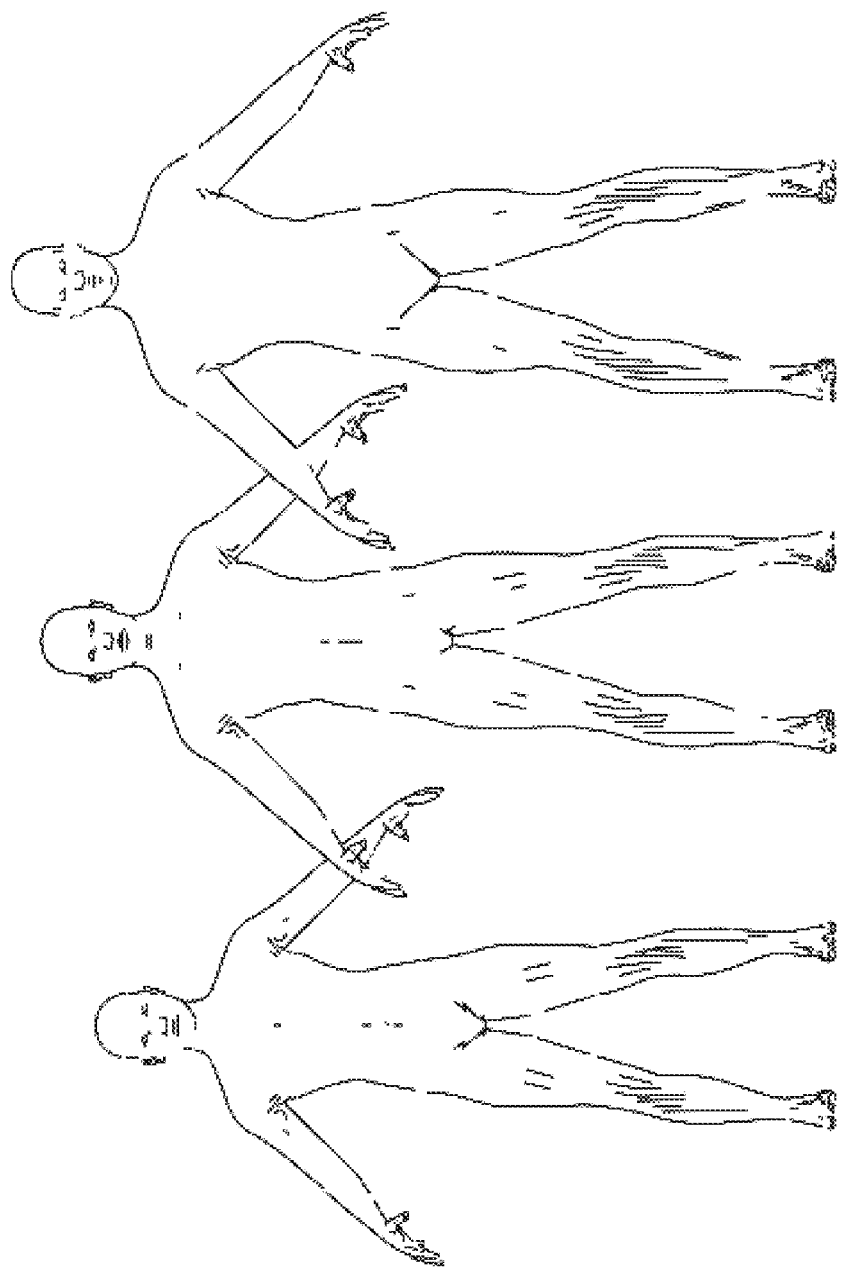

FIG. 1D shows gathering of input data for customization towards gender or ethnicity of the user(s).

Figure 1E:
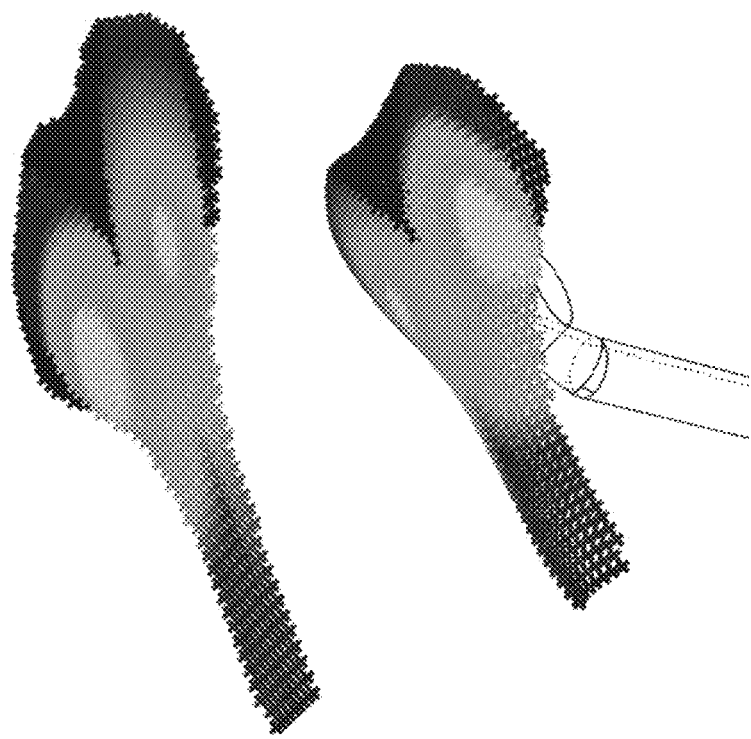

FIG. 1E shows gathering of input data comprising heat maps gathered from users and or user interaction with a product (in this case, a bicycle saddle), for example a sweat map or a pressure map.

Figure 1F:
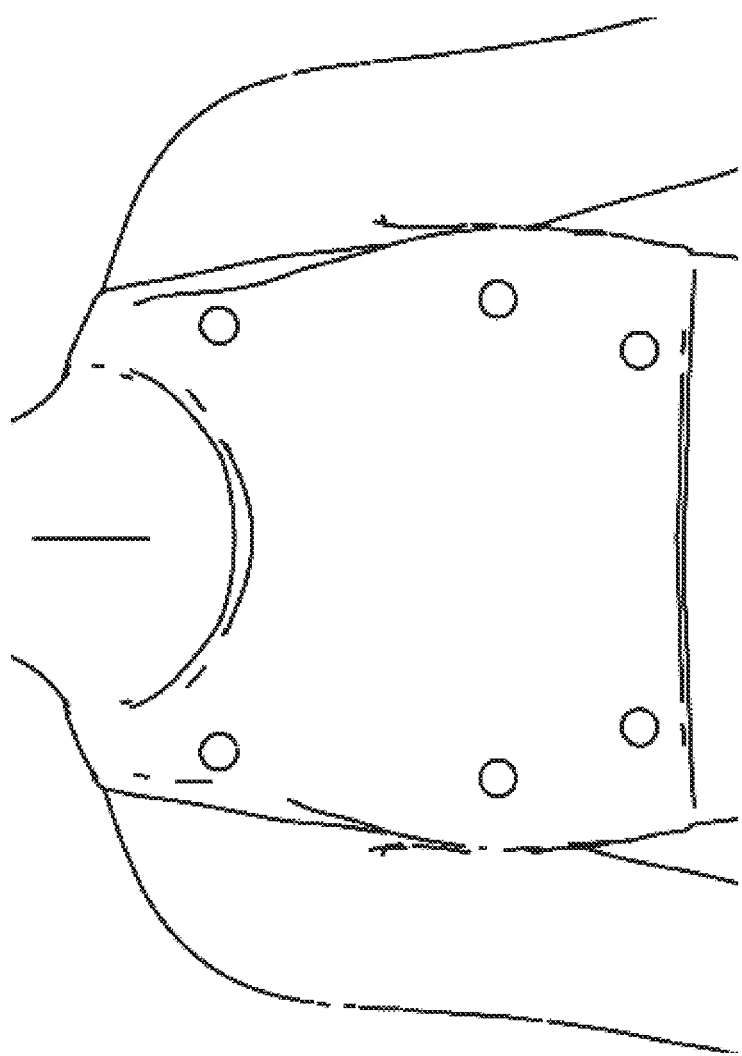

FIG. 1F shows gathering of input data comprising motion tracking data (in this example, motion data from several movement points on a sports bra).

Figure 1G:
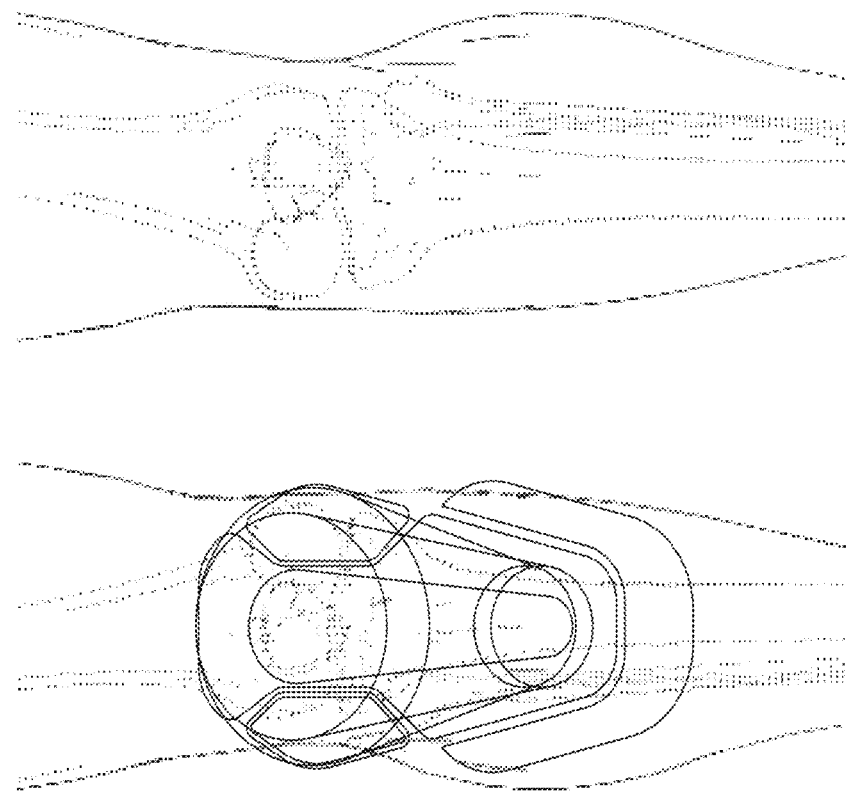

FIG. 1G shows gathering of input data comprising zones based on anatomical data.

Figure 1H:
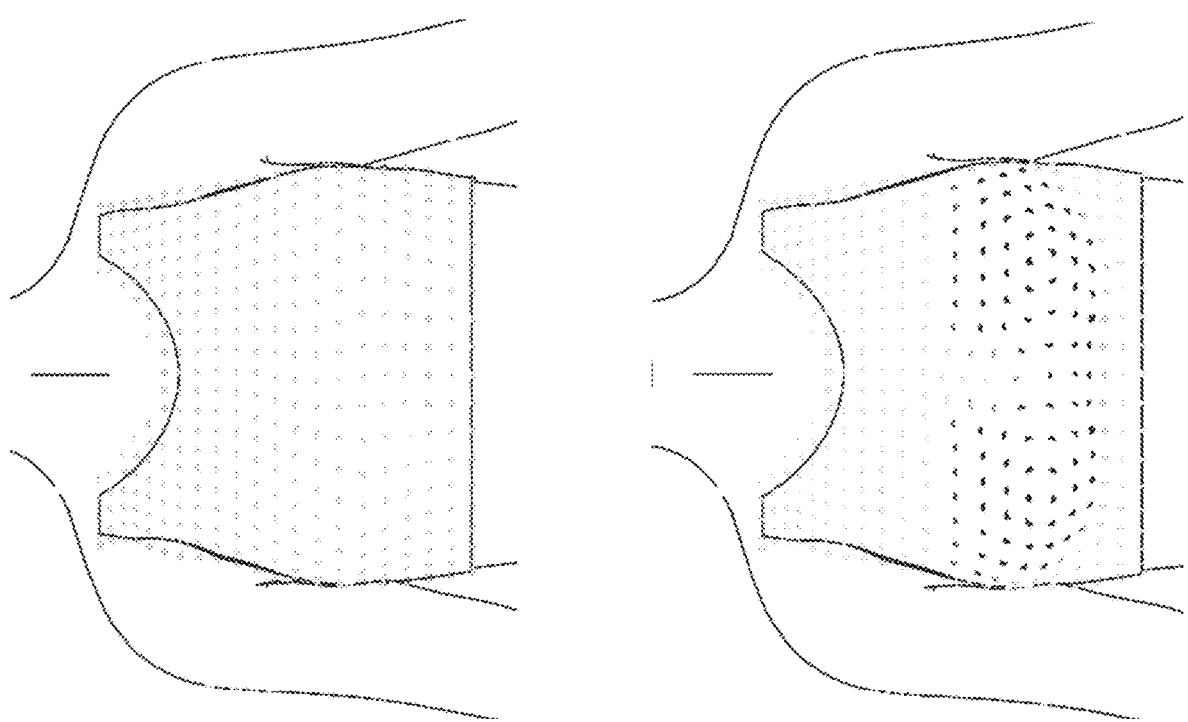

FIG. 1H shows gathering of input data comprising a digital image correlation gathered from users (in this case, movement of caps in a sports bra during a run).

In embodiments, processing of the obtained input data comprises analyzing the obtained input data to make one or more measurements of anatomic structure in one or more possible impact areas of the anatomy of the one or more users.

In embodiments, the one or more measurements are related to at least one of thickness of bone and soft tissue, the distance between bone and skin surface, posture during impact, a direction of impact, and a known injury location or area.

In embodiments, processing of the obtained input data comprises interpolating the obtained input data to generate a three-dimensional intensity map around a predetermined body part or parts of the one or more users. In embodiments, the intensity map defines one or more of: one or more zones having different energy control performances, thickness between the upper surface of the single layer and the lower surface of the single layer, and overall shape or outline of the anatomical protective item.

In embodiments, processing of the obtained input data comprises interpolating the obtained input data to generate a three-dimensional intensity map of distances between vertices of tissue mesh and bone mesh of the one or more users.

In embodiments, the input data is associated with a single user such that the anatomical protective item is manufactured for use by the single user. Such embodiments can provide anatomical protective items customized to an individual user.

In embodiments, the input data is associated with a plurality of users of a given type such that the anatomical protective item is manufactured for use by multiple users of the given type. Such embodiments can provide anatomical protective items customized to a number of users who share some common features/attributes, for example a group of cyclists, players of a given sport or activity, etc.

Data Interpolation

According to embodiments, the input data is digitally interpolated to 3D intensity maps around the relevant body part or product. This map defines or is used as guidance to different performance zones, material thickness and overall part outlines. Particular areas of interest for more protection, and more venerable or sensitive areas can be considered.

In embodiments, the distances between vertices of the tissue mesh and bone mesh are measured and the skin surface is visualized as a three dimensional intensity map. The outline of the protector is determined according to a testing protocol and occurrence of injuries. For example, EU standard EN1621 part 1 defines a minimal protector zone for an elbow pad to be of a certain size, often given as a 2D outline; these outlines often relate to the height of the wearer. This means that the outline of the protective item would generally need to cover at least that area in addition to any area that appears susceptible to impact according to the intensity map. In case of a padding design, such as bicycle seat, the entire seat area can be analyzed for pressure points during usage.

In embodiments, the curvature of the protective item is optimized to follow the general skin curvature in addition to other manufacturing considerations, such as demolding of the part. In some cases, an intentional local gap is made between the skin and the protector to enhance performance. For example, in a shin protector, a gap can be made above the tibia bone, and in a hip protector a thinner section can be above the greater trochanter (GT). In some cases, additional thickness is added in the coronal plane to increase protection from side impacts without increasing the thickness of the overall part.

In embodiments, the thickness of the protective item is defined according to the intensity map and other protective considerations such as possible stud impact. In a shin pad for example, the thickest area can be above the tibia bone and then thickness gradually reduced relative to the distance from the tibia bone.

In embodiments, a simulation of how the protective item will bend when the joint moves is run to identify crease areas. If needed, the protective item is split into individual segments to accommodate motion of the joint.

In embodiments, the input data is digitally interpolated to 3D intensity maps around the relevant body part or product. This map defines or used as guidance to different performance zones, material thickness and overall part outlines.

Figure 2A:
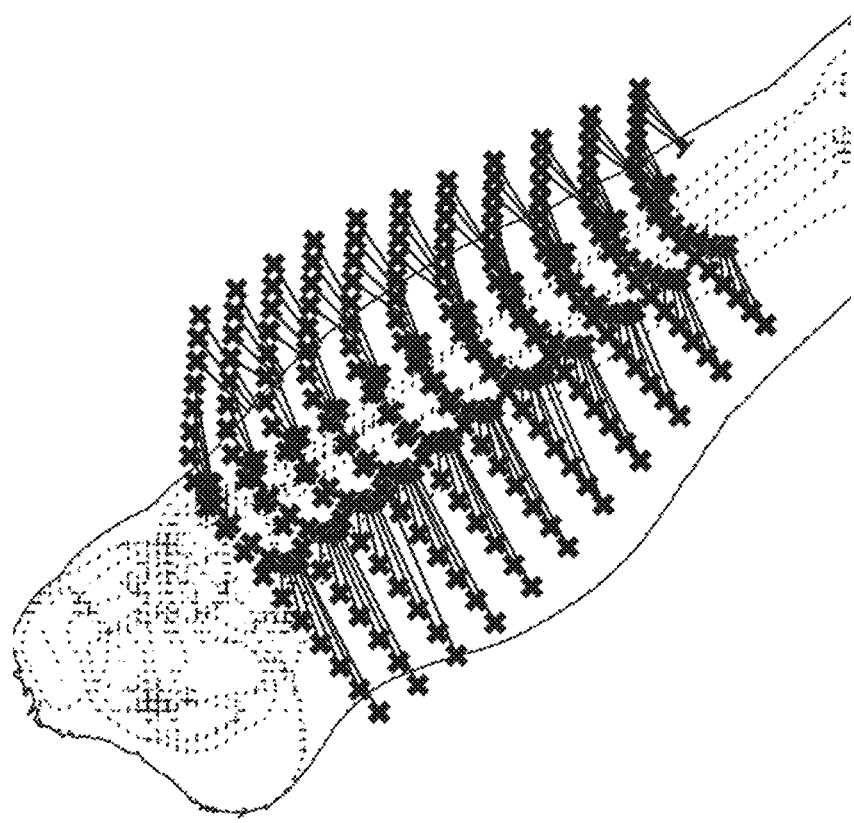
FIGS. 2A-2F show various data interpolation methods according to embodiments.

FIG. 2A shows data interpolation comprising measuring distance between vertices of tissue mesh and bone mesh according to embodiments.

Figure 2B:
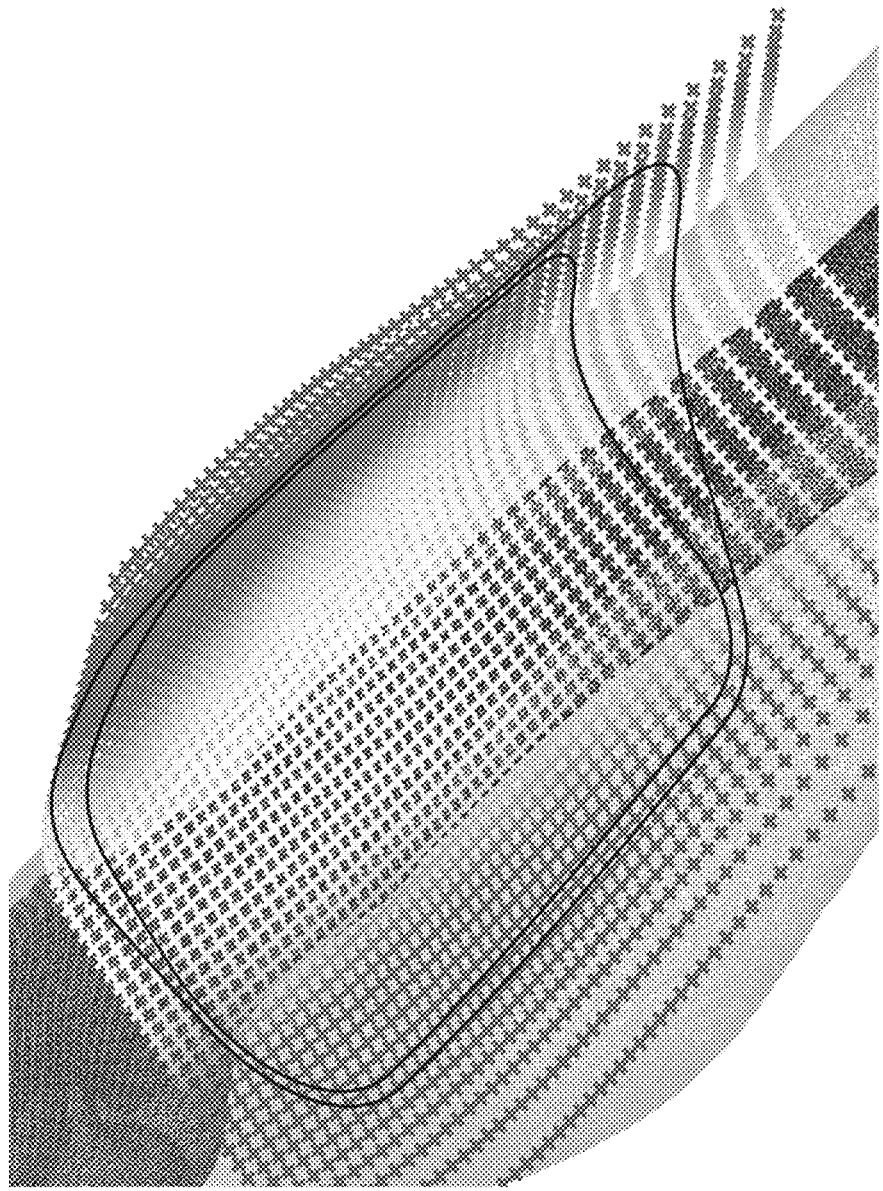

FIG. 2B shows data interpolation comprising remapping of distance to color values and each face of the tissue mesh is colored/shaded according to its distance to the bone.

Figure 2C:
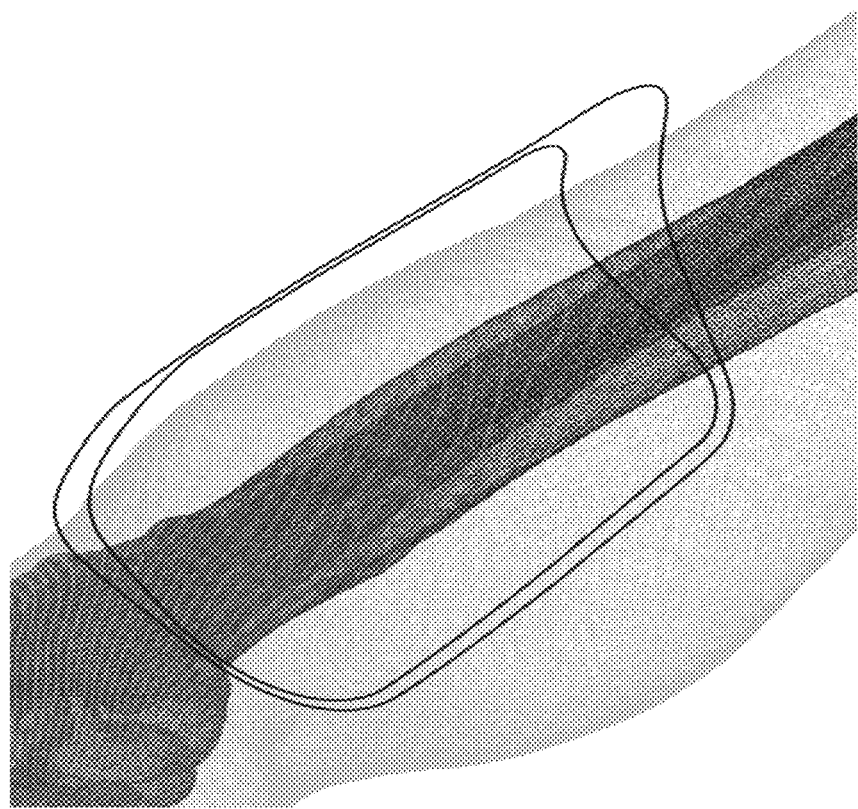

FIG. 2C shows data interpolation comprising determining the outline of the protector according to testing methods and occurrence of injuries.

Figure 2D:
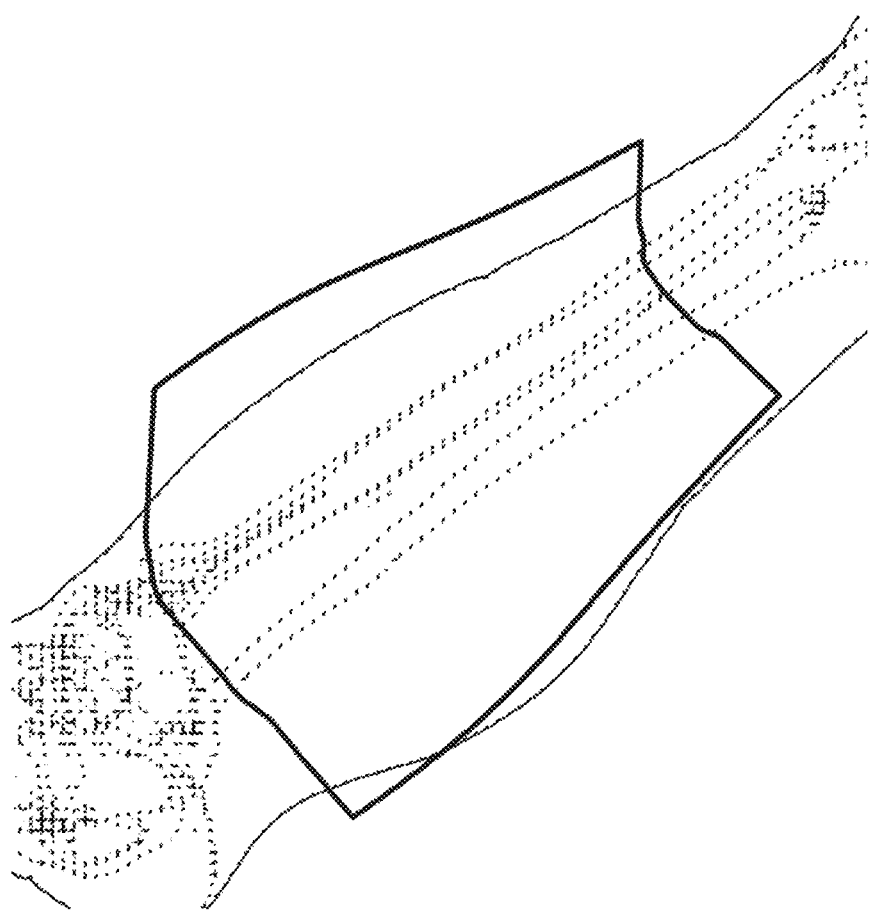

FIG. 2D shows data interpolation comprising designing the bottom surface of the protector to follow general body curvature, manufacturing limitations and performance features. In some embodiments, a gap is made between the body surface and the protector to improve performance.

Figure 2E:
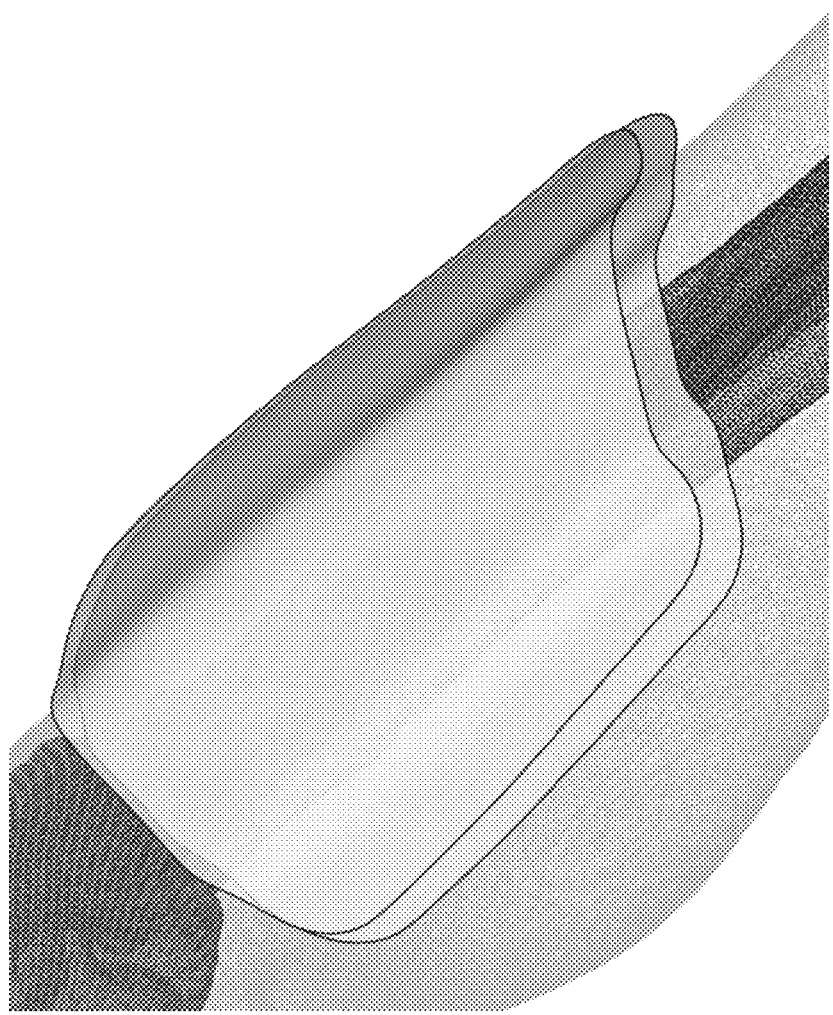

FIG. 2E shows data interpolation comprising designing an upper surface of the protector, thus defining the thickness of the protector in different areas.

Figure 2F:
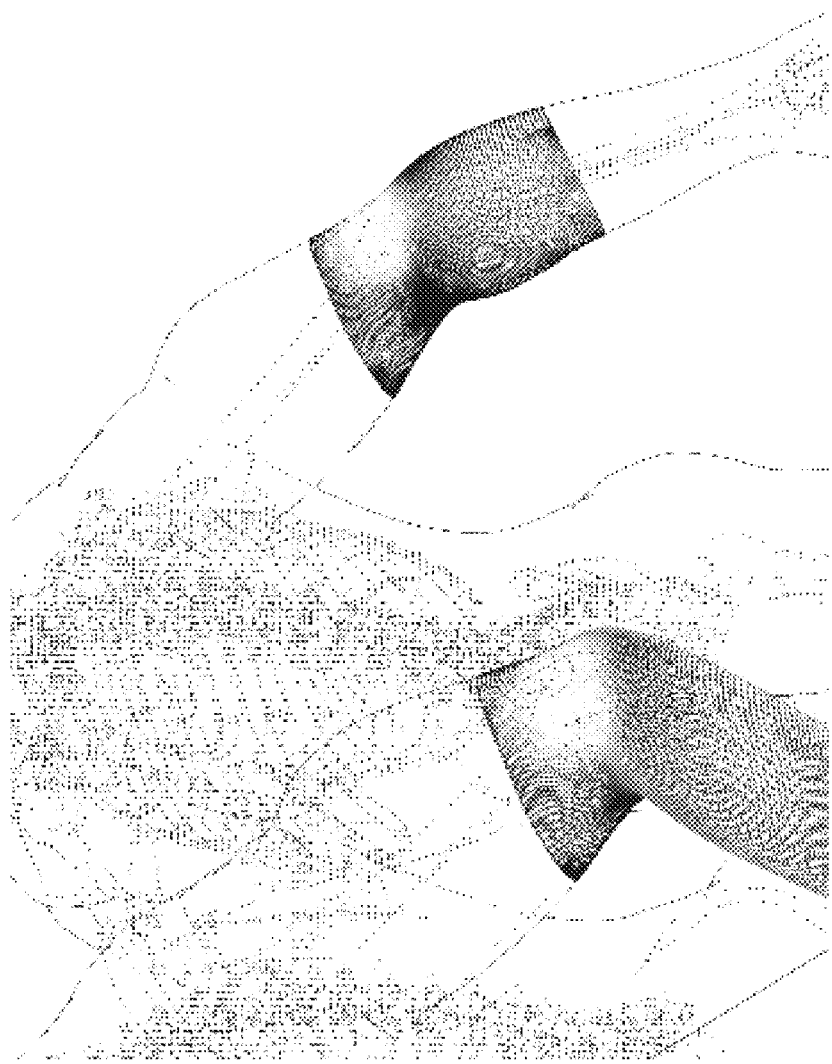

FIG. 2F shows data interpolation comprising identifying crease areas digitally and/or manually.

Geometry Construction

In embodiments, the protective item is built based on an intensity map and possibly also aesthetic and acquired know-how considerations of the designer. The process generates cells with varying size, profile and/or orientation and then either subtracts them from the main body of the protector or joins them together to form a part (see FIG. 4). In embodiments, a combination of a cell packing and surface tessellation is used to optimize part weight and performance. This combination allows the number and shape of cells to be maximized in such a way that there is no/minimal unnecessary material in the protective item. The protective item is as light as it can be and every portion of the protective item is optimized for a performance parameter, impact, weight, breathability, flexibility and/or impact.

Packing processes (or "mechanisms", "algorithms") solve the mathematical problem of packing n number of geometric shapes in a confined surface or volume. Packing processes are known in nature and industrial processes. Packing efficiency is the percentage of total space filled by the packed units. A packing process will typically generate void unused areas, particularly when irregular shapes are packed by shapes with varying sizes such as needed in a body armor protector. These are often double curvature surfaces with rounded outlines.

Tessellation divides a surface into identical tiling units such as hexagons. This process creates equal size units and does not allow variation of units. Moreover, when irregular shapes are tessellated, void areas can be formed.

Embodiments employ a surface tessellation process to determine the position of the one or more walls of each energy controlling cell. Embodiments employ a surface tessellation process to determine the orientation of the one or more walls of each energy controlling cell.

In embodiments, the surface tessellation process performs a trade-off between the overall weight of the anatomical protective item and the energy controlling performance of the energy controlling cells of the anatomical protective item. The surface tessellation process may for example comprise a Voronoi tessellation process.

In embodiments the Voronoi tessellation process comprises a weighted centroidal Voronoi tessellation process wherein: one or more energy controlling cells comprise a uniform shape; and one or more energy controlling cells comprise a different shape dependent on weightings associated with the one or more energy controlling criteria.

In embodiments, a combination of a packing process and a surface tessellation process is used. In embodiments, a packing process is first executed to allocate center points of each unit and then a tessellation process is applied according to these central points (see FIGS. 4A and 4B respectively). In some embodiments, a circle packing algorithm serves as a basis to create a weighted centroidal Voronoi tessellation. This results in a special case of Voronoi tessellation, where a given shape is divided into n convex polygons. The shape is divided such that each of the polygon's vertices is closer to its own central point than to any other point. In simple cases of Voronoi tessellations, cells are of random size and shape whereas in a centroidal one, cells have uniform shape but can have different size according to weighting, surface boundary and curvature. In embodiments, the weighting is carried out according to an anatomic intensity map.

Figure 3:
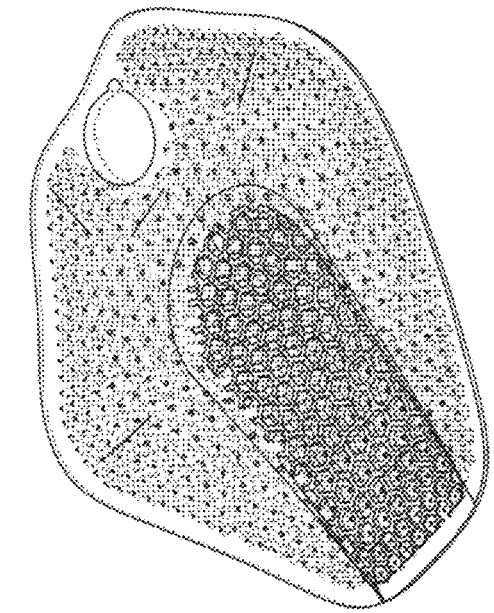
FIG. 3 shows weighted centroidal and non-weighted Voronoi energy controlling cell packing according to embodiments.
Figure 3:
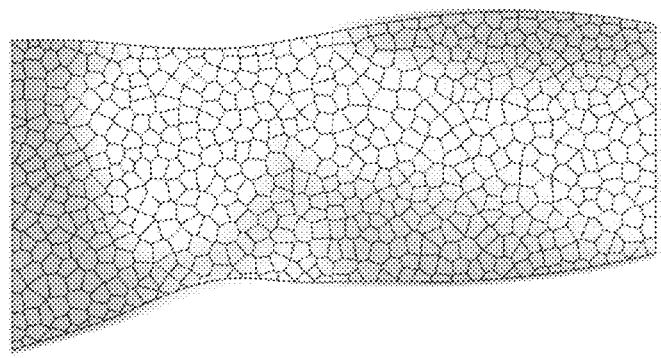
Figure 3:
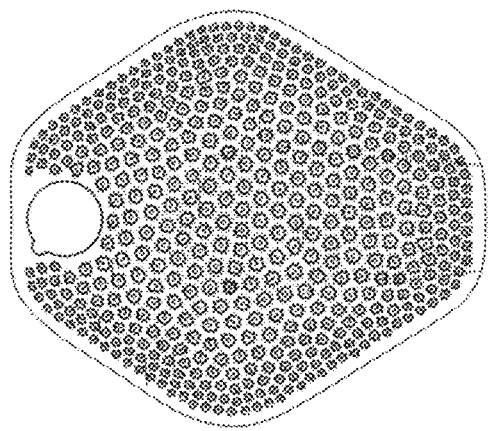
Figure 3:
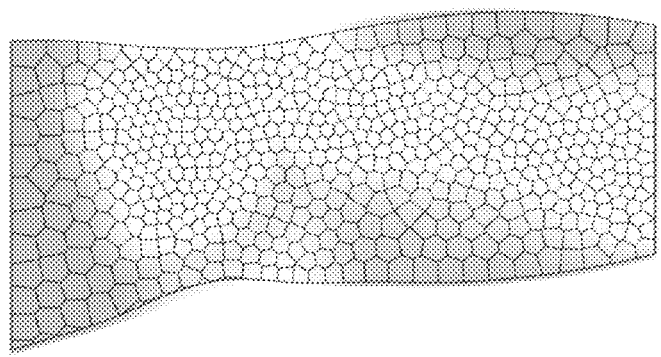

The embodiments depicted on the left-hand side of FIG. 3 show weighted Voronoi energy controlling cell packing in a protective part according to an intensity map. The embodiments depicted on the right-hand side of FIG. 3 show non-weighted Voronoi energy controlling cell packing in a protective part without consideration of the intensity map. The latter produces cells of random sizes in random areas whereas the weighted centroidal one on the left has controlled cell size according to intensity map.

Whilst the packing optimization involves mathematical processes, embodiments can also involve aesthetical control of the resulting tessellation. In embodiments, a computer is employed to generate multiple optimized tessellations. In many cases, multiple packing variations will provide similar and or identical performance abilities. Therefore, a designer can run through these iterations until an aesthetically pleasing iteration that satisfies the performance criteria is achieved.

According to embodiments, the generated tessellation is not the actual energy controlling cells but serves as an outline to generate them. In embodiments, re-entrant geometries are employed to provide highly efficient impact resistance. In embodiments, a unique re-entrant profile is assigned to each tessellating unit to create cells that have one or more walls.

The term re-entrant (for example, a shape including an interior reflex angle) is generally used (unless referred to as otherwise) herein to refer to the shape of a cell (or one or more walls thereof) when at rest. This is as opposed to the shape of a cell when deformed during/due to impact (as even a straight wall may deform and become re-entrant when impacted/deformed).

Figure 4A:
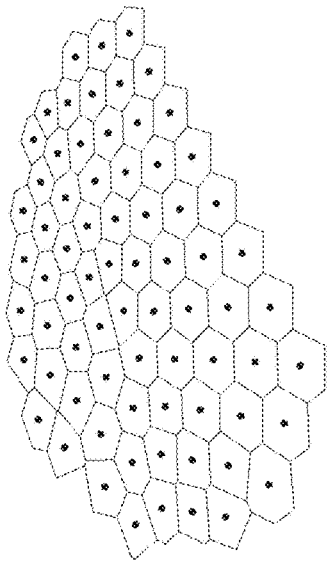
FIGS. 4A-4F show cell generation for a portion of a protective item according to embodiments.
Figure 4B:
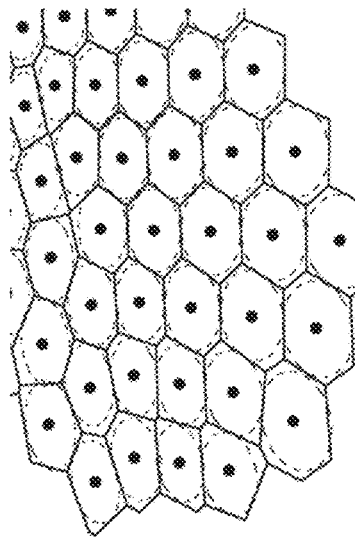
Figure 4C:
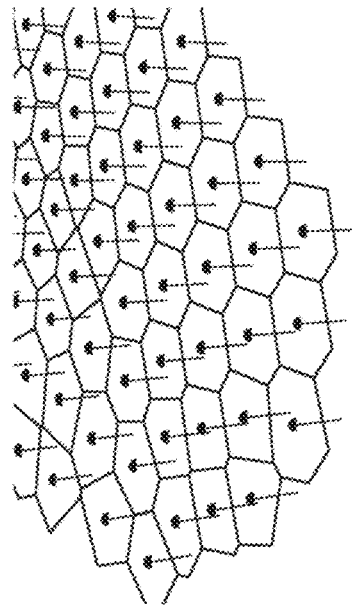
Figure 4D:
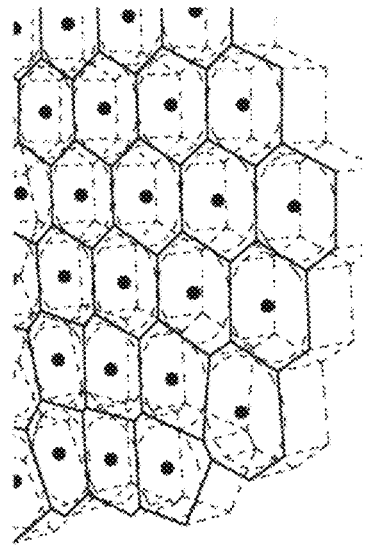
Figure 4E:
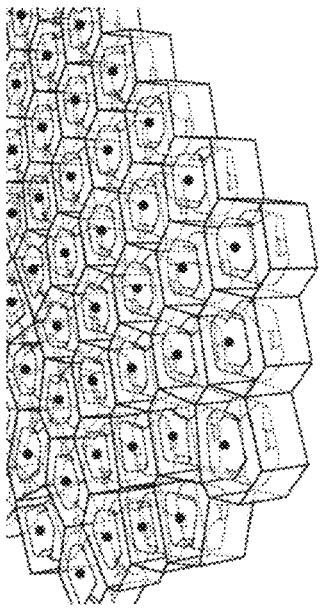
Figure 4F:
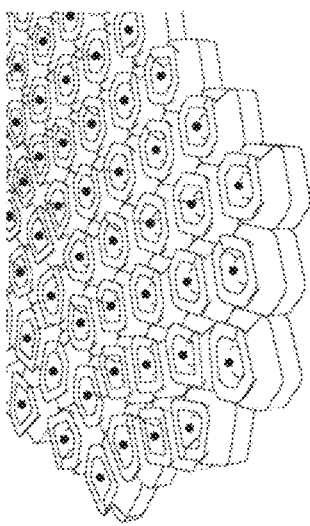

FIG. 4A-4F show cell generation of a portion of a protective item according to embodiments. Centre-points for given energy controlling cells are allocated by the packing process is shown in FIG. 4A. A tessellation process is then applied to the center points as shown in FIG. 4B. An axis for each of the given energy controlling cells is shown in FIG. 4C and can be seen to pass through the center point for each given energy controlling cell. The positions of one or more walls of each given energy controlling cell determined by the surface tessellation process are shown in FIG. 4D. The profile of each controlling cell is generated and swept along the outline of each cell and either subtracted from the main volume of the protector as shown in FIG. 4E or comprises individual cells as shown in FIG. 4F.

A packing process (or "algorithm" or "mechanism") is employed to generate each energy controlling cell in the single layer. Each energy controlling cell comprises one or more walls which extend from an upper surface of the single layer to a lower surface of the single layer. The packing process is performed at least on the basis of the identified one or more energy controlling criteria. The anatomical protective item comprising the single layer of energy controlling cells is manufactured, for example using one or more of an injection molding process and an additive manufacturing process.

In embodiments, each energy controlling cell is orientated between the upper surface and the lower surface along a respective axis, and the packing process allocates a center point for each energy controlling cell through which its axis passes.

In embodiments, one or more of the energy controlling cells comprise an internal cell wall re-entrant geometry. In embodiments, one or more of the energy controlling cells comprise a first internal cell wall re-entrant geometry, one or more other of the energy controlling cells comprise a second internal cell wall re-entrant geometry, and the second internal cell wall re-entrant geometry is more re-entrant than the first internal cell wall re-entrant geometry.

In embodiments, the one or more energy controlling criteria define weightings for the energy controlling cells, a relatively high weighting for an energy controlling cell is associated with a relatively high level of protection to a body part of a user from impact on the respective energy controlling cell of the protective item, and a relatively low weighting for an energy controlling cell is associated with a relatively low level of protection to a body part of a user from impact on the respective energy controlling cell of the protective item.

In embodiments, the second internal cell wall re-entrant geometry is allocated to energy controlling cells with the relatively high weighting, and the first internal cell wall re-entrant geometry is allocated to energy controlling cells with the relatively low weighting.

In embodiments, cell profiles are assigned in such way that the resulting wall thickness between each cell is as thin as possible. The profiles can be aligned to the Z axis (e.g. an injection mold pull direction) or normal to the surface curvature. Each unique re-entrant profile is swept along the perimeter of each tessellating unit creating energy controlling cells. Cells can vary in height and their profile can change from having straight walls or re-entrant walls. Cells can be subtracted from a part, generated individually to form the part or gradually transform between subtractive and additive cells (as shown in FIGS. 4E and 4F respectively). Parts with individually packed cells provide more flexibility than cells that are made by subtracting them from the main body.

In embodiments, at least one of the cells comprises an opening at one or more of the upper surface and the lower surface of the single layer.

Figure 5A:
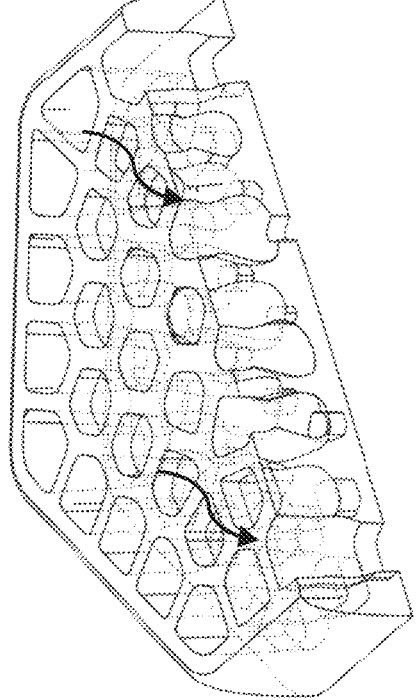
FIGS. 5A-5B show energy controlling cells having a varying re-entrant profile according to embodiments.
Figure 5B:
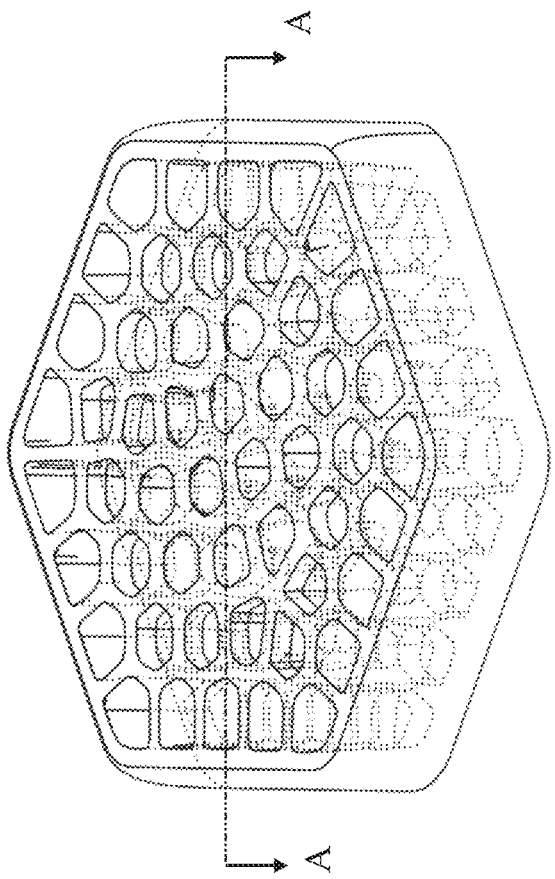

FIGS. 5A and 5B show energy absorbing cells having a varying re-entrant profile in a Voronoi packing, where FIG. 5A shows a cross-section A-A of the part shown in FIG. 5B.

Figures 6A, 6B:
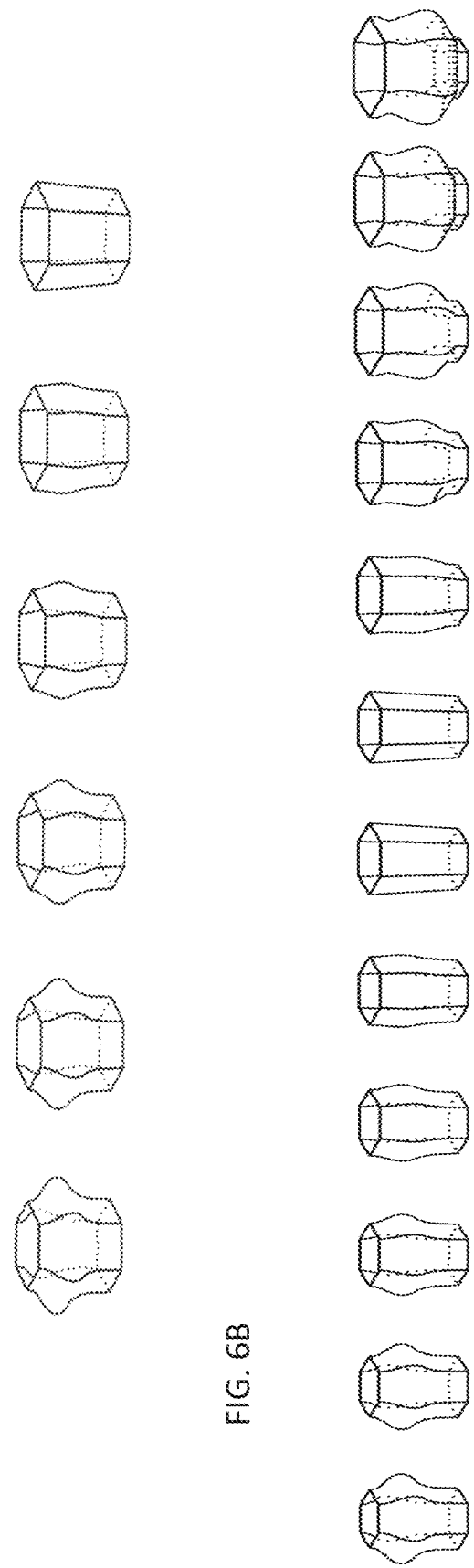
FIGS. 6A-6B show morphing/transforming between different cell profiles according to embodiments.

In embodiments, the number of unique energy controlling cell profiles interpolated in the design can be two or more. FIG. 6A shows morphing/transforming between two different cell profiles (on the left-hand side and on the right-hand side) to provide different levels of impact protection, thus generating a range of unique cells. FIG. 6B shows morphing/transforming between three different cell profiles (on the left-hand side, in the middle, and on the right-hand side) to provide different types of protection, thus generating a range of unique cells.

Figure 7A:
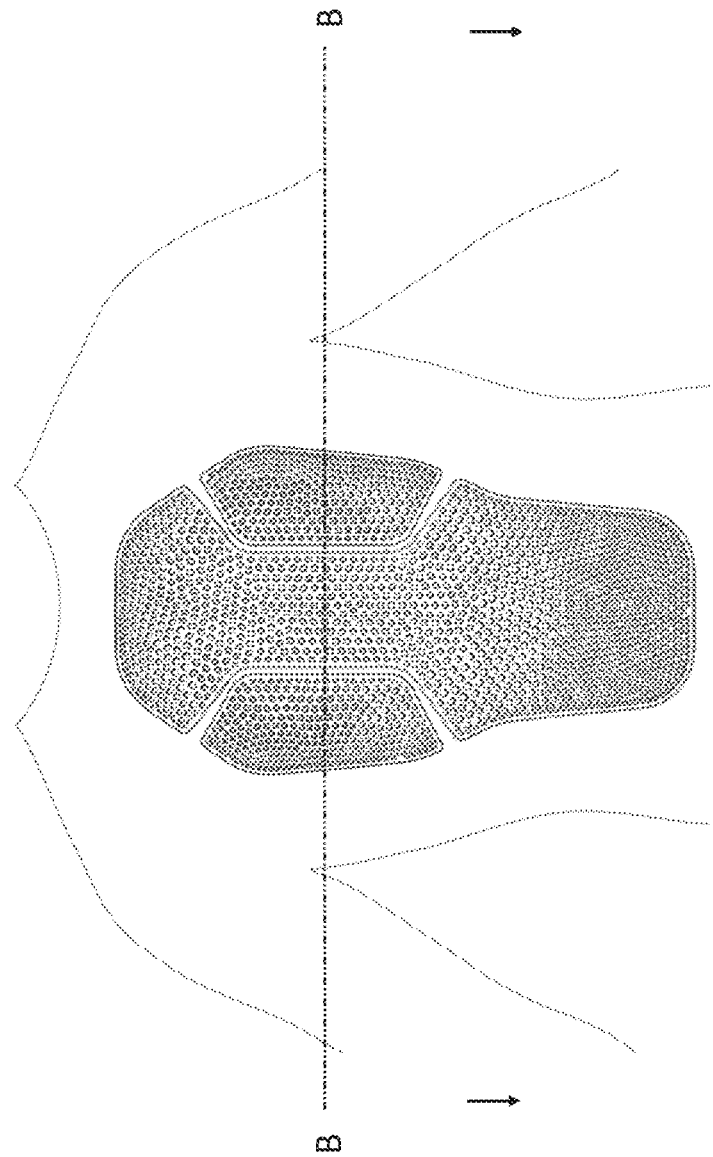
FIGS. 7A-7B show packed re-entrant energy controlling cells varying according to body curvature according to embodiments.
Figure 7B:
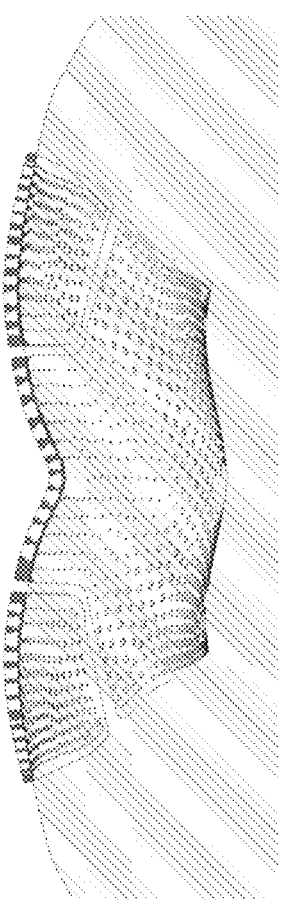

FIGS. 7A and 7B show packed re-entrant energy controlling cells varying according to body curvature for a back protector. Cell orientation corresponds with body surface. FIG. 7B shows a cross-section B-B of the part shown in FIG. 7A.

Figure 8B:
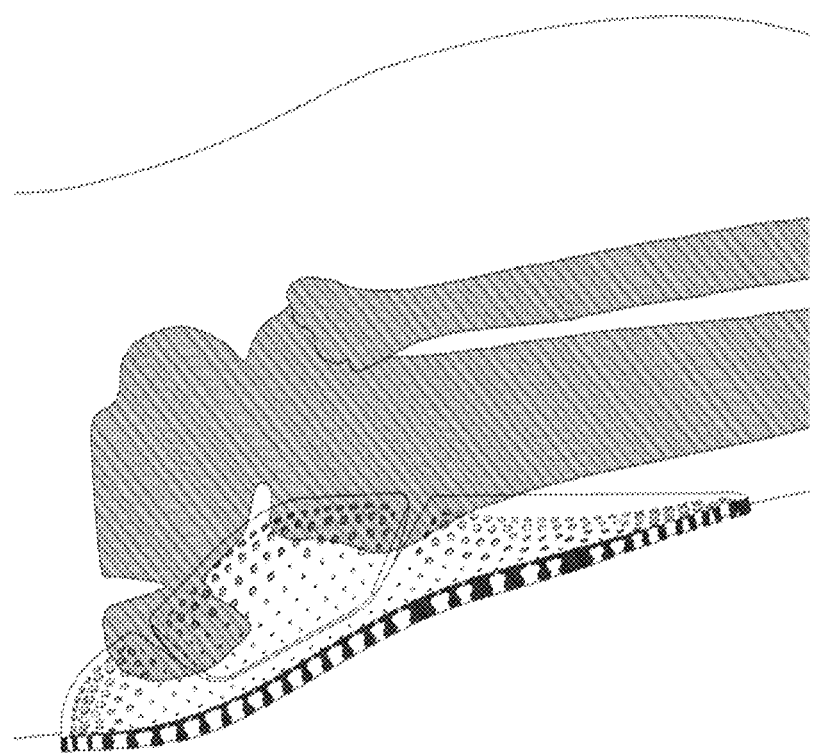
FIGS. 8A-8C show re-entrant energy controlling cells varying according to bone location according to embodiments.
Figure 8A:
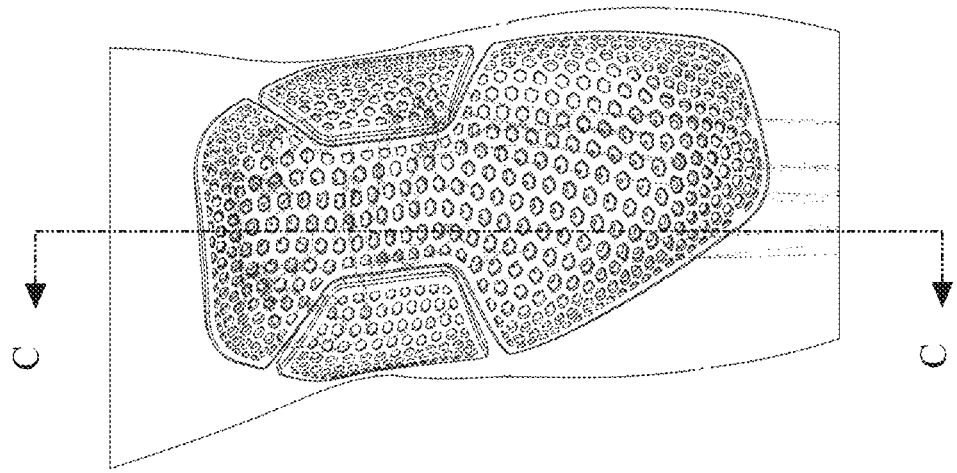
Figure 8C:
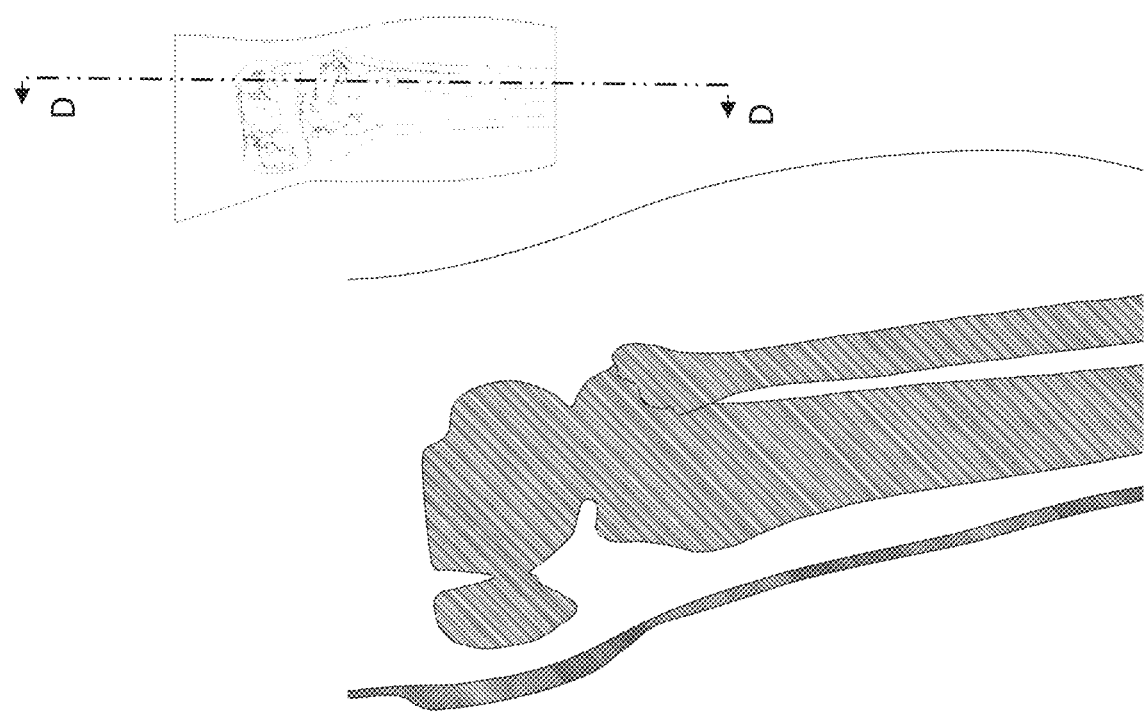

FIGS. 8A-8C shows re-entrant energy controlling cells varying according to bone location. FIG. 8B shows a cross-section C-C of the part shown in FIG. 8A. FIG. 8C shows part thickness variation across a cross-section D-D.

Figure 9A:
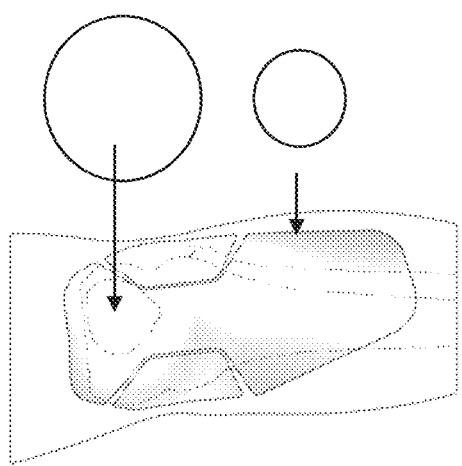
FIGS. 9A-9L show various geometry construction processes according to embodiments.
Figure 9B:
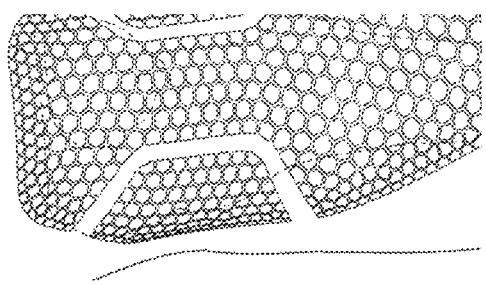
Figure 9C:
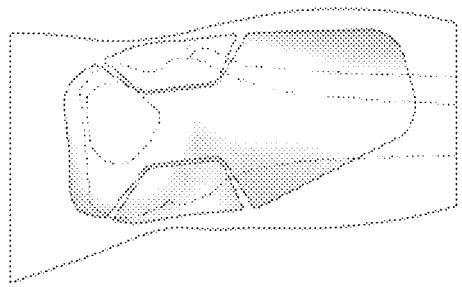
Figure 9D:
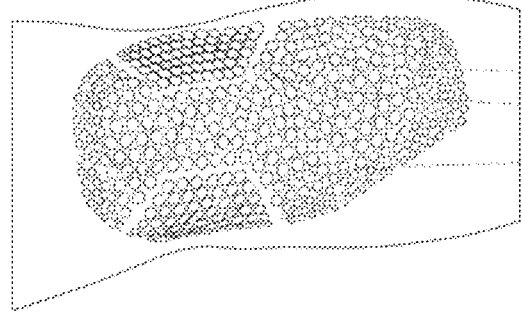
Figure 9E:
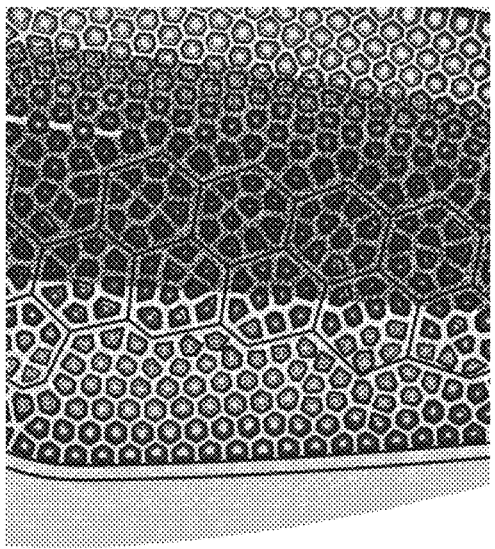
Figure 9F:
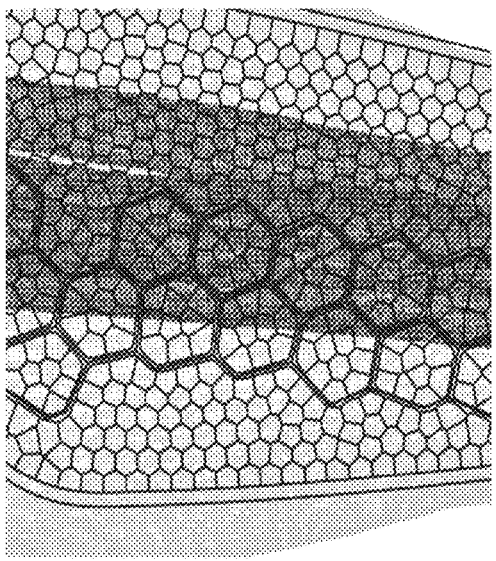
Figure 9G:
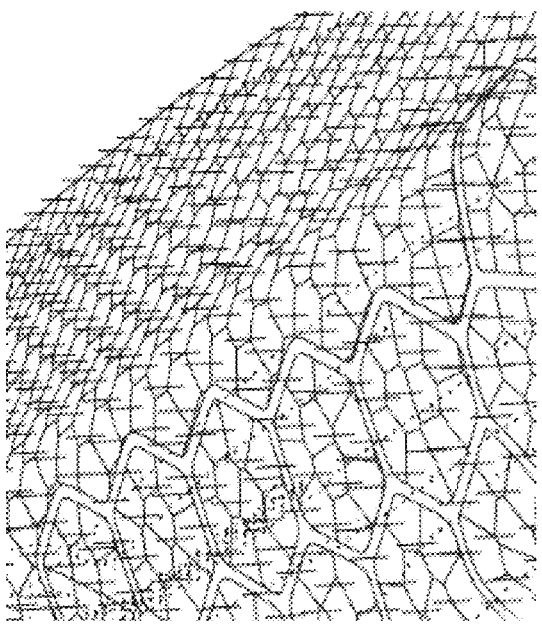

In some embodiments, nested tessellations are created to create local "super cells" (as shown in FIG. 9G). In some such embodiments, a packing of larger cells is initially generated and then a second sub-packing algorithm is run based on the points that were generated in the first one. Such "super cells" add local flexibility in a part without hindering the performance that is required for that area.

Embodiments have been applied to protect movable and non-movable joints and body parts in a range of sports, medical and military products.

In one application of embodiments, a football shin guard was designed and manufactured. The shin guard weighs 69 grams and passes EN13061 testing standard for both blunt and stud impact by a great margin. The thickness of the part varies between 5.5 mm and 4 mm, making it extremely light and slim. This design has been made using a Computed Tomography (CT) scan and protector size was defined for the 50th percentile. However, the parametric CAD modelling is employed and therefore protector size can be adjusted to different heights. In this example application, a 2 mm gap was made above the tibia bone and additional thickness was added in the coronal plane to improve stud impact performance. Nested, weighted and centroidal Voronoi tessellation was used to generate impact energy cells. The cells were made using a subtractive method, by generating a negative void from the main body part.

In another application of embodiments, a protector for a moving joint, knee and elbow protector for motorcycling was designed and manufactured. The final design passed CE testing, namely EN1621 part 1 testing and attained level 2 performance and weighed 65 grams. In this design, anthropometric data was gathered to define core central zone and lateral zone. The protector was segmented into a main part and smaller wing parts to accommodate movement of the joint.

In another application of embodiments, a medical hip protector was made to protect the greater trochanter (GT) bone. Certain medical conditions and age groups are more susceptible to breaking, inflammation or displacement of the hip. Existing padding is often more than 10 mm thick making it visible and uncomfortable for users to wear. However, embodiments facilitated the design and manufacture of a thin, light and seamless hip protector. In this design, material thickness was reduced to zero towards the edges to integrate with the surface of the body in the most seamless way. Additional straight walled cells were added at the bottom of the protector above the femur bone to increase protection levels.

In another application of embodiments, an ice hockey shoulder pad (or "cap") was designed and manufactured. These pads are often made from a thick layer of Expanded Polypropylene (EPP) covered with a thin layer of high-density polyethylene (HDPE). Testing of the existing pads showed that EPP is able to withstand the first impact well, however with any additional impacts the performance drops. This is related to the molecular structure of foam that is damaged during significant impact. This property is particularly disadvantageous in a contact sport such as ice hockey where multiple impacts are sustained by the players frequently. Hockey shoulder caps are typically elevated from the surface of the body and so in these embodiments, the location of the clavicle and upper arm bone was projected onto the cap surface to create an intensity map. Design of a lightweight breathable part is especially important here since a heavy part would limit player's speed and mobility. In addition, a players' uniform is typically made of non-breathable foams, trapping body heat inside. Having breathable shoulder caps allows ventilation in a chimney effect. In these embodiments, multiple iterations of packing tessellations were generated in parallel to physical testing to optimize weight, performance and maximal area coverage. Here, a combination of subtractive and additive cells was used, to control fit and performance. The bottom part of the protector had soft individual cells to consider possible contact with the body. The bottom part of the cells was hard subtractive cells to consider impacts between players.

In another application of embodiments, a bicycle saddle was designed and manufactured. Here, a pressure map was obtained and wrapped around the bicycle saddle to create a three dimensional intensity map. The pressure variation along the saddle varies greatly, with significant hotspots created where the gracilis muscles rub against the saddle most. Due to the high curvature difference along the saddle, individual re-entrant cells were packed such that the smaller cells were concentrated in high pressure areas. This is to make them less intrusive and less easily felt by the rider.

In another application of embodiments, a military recoil pad was designed and manufactured according to embodiments. The developed pad is ambidextrous and is only 6 mm thick.

In another application of embodiments, a sports bra was designed and manufactured according to embodiments. The developed bra exhibits very thin cells tessellated and weighted according to intensity map in rectangular, auxetic and Voronoi diagrams. The bra is breathable, providing freedom of movement whilst restricting movement only in the necessary areas on the shoulder and below the caps.

Embodiments employ visual programming software within CAD to execute and iterate the different designs. Visual programming software allows the development of bespoke definitions/algorithms with custom libraries of components and existing mathematical algorithms. Methods were designed to execute every step from input analysis and interpolation to final geometry construction.

In embodiments, the protective item is built based on one or more intensity maps as well as aesthetic and acquired know-how considerations of the designer.

The embodiments of FIG. 9A show geometry construction comprising splitting a surface according to crease areas.

The embodiments of FIG. 9B show geometry construction comprising defining the maximum and minimum diameter of energy controlling cells by distance to bone and weight target. In embodiments, the area of the average or proportional (i.e. going from one cell profile to another in a number of steps) cell size is divided by the total area of the protector to define the number of cells that need to be packed and tessellated.

The embodiments of FIG. 9C show geometry construction comprising populating the surface of the protective item with the calculated number of points in random places on the protective item. The embodiments of FIG. 9C also show geometry construction comprising optimizing the location of the points using a circle packing algorithm driven by the intensity map. Cell size is allocated according to the intensity map. The embodiments of FIG. 9C also show geometry construction comprising iterating a surface packing mechanism until an aesthetically pleasing packing is achieved.

The embodiments of FIG. 9D show geometry construction comprising converting the optimized points to weighted Voronoi tessellation.

The embodiments of FIG. 9E show geometry construction comprising employing nested packing by creating big cells that are populated by smaller ones. This creates localised "super cells" that add to part flexibility and/or performance.

The embodiments of FIG. 9F show geometry construction comprising smoothing cells' radii to ease manufacturing and improve aesthetics.

Figure 9H:
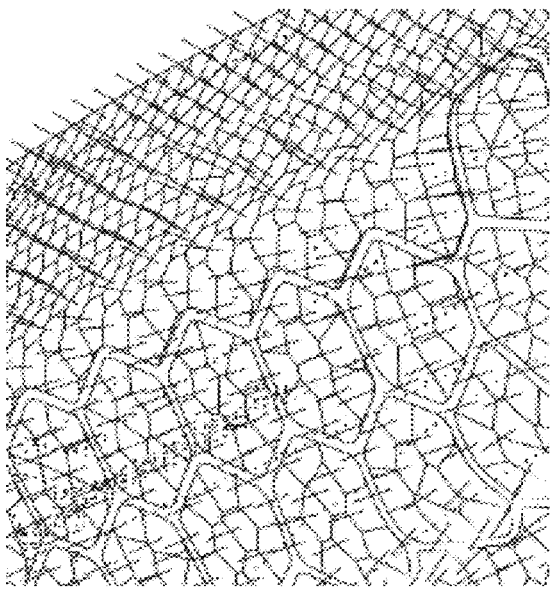

The embodiments of FIG. 9G show geometry construction comprising drawing a line from the center of each cell to the upper/bottom surface of the single layer. The orientation of the line can be normal to a surface or tilted towards expected direction of impact. This defines an axis for each cell. In embodiments, the line is either normal to a surface or normal to an injection molding part-pull direction. In FIG. 9G, the axis direction is normal to surface, whereas in FIG. 9H, the axis direction is normal to an injection molding part-pull direction.

Figure 9I:
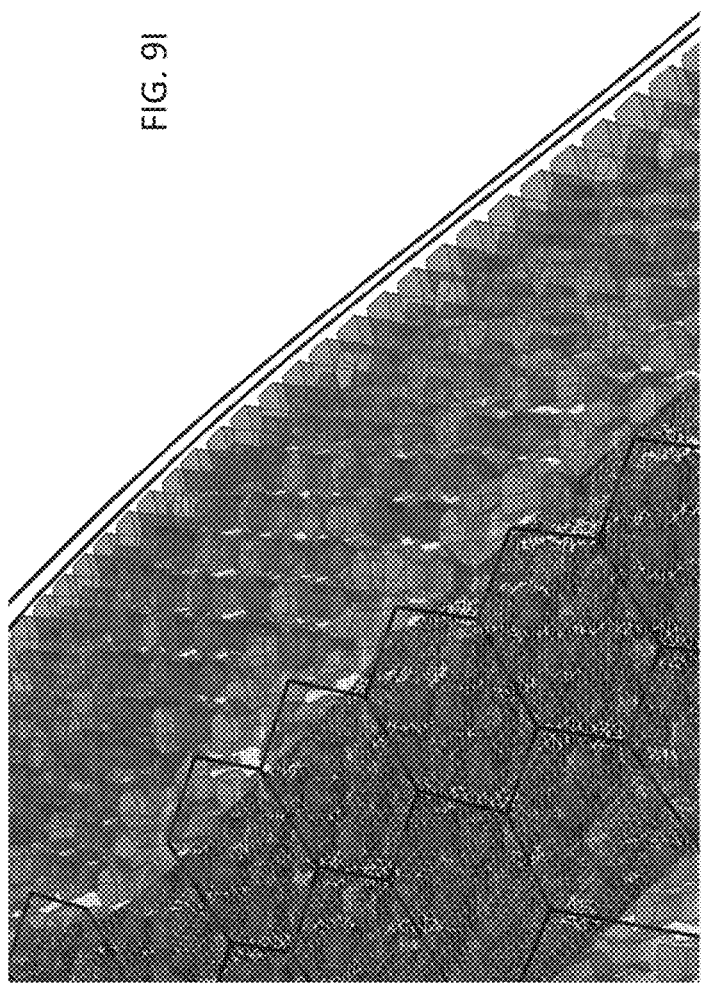

The embodiments of FIG. 9I show geometry construction comprising defining two extreme cell profiles, in this example very re-entrant and straight. These profiles transform according to the location of the cell in the intensity map. Typically, cells closer to the bone are more re-entrant compared to cells further from the bone which are more are fully open (more straight walls, less re-entrant) to save on weight and material.

Figure 9J:
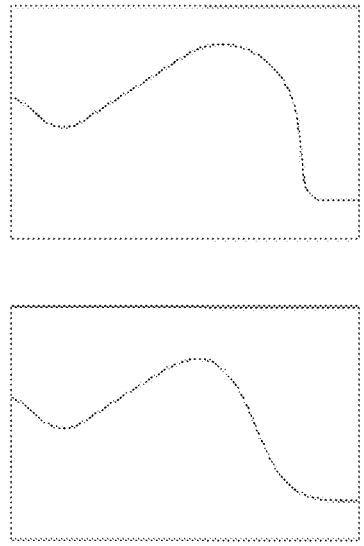
Figure 9K:
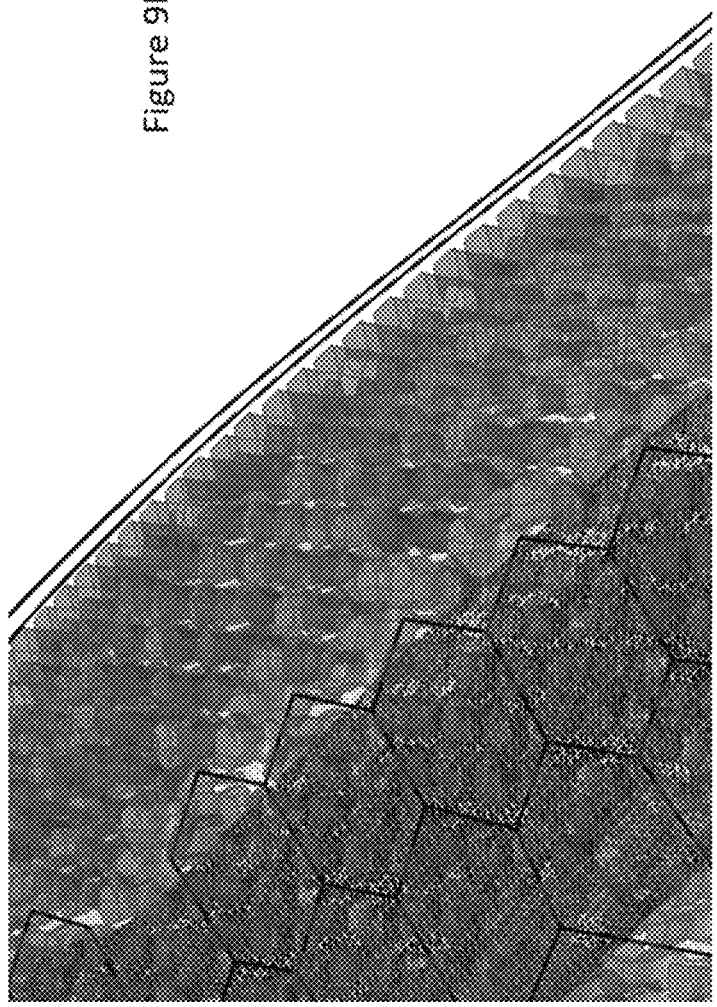
Figure 9L:
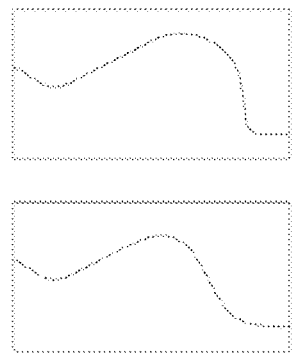

The embodiments of FIG. 9J show geometry construction comprising optimizing cell profiles according to the slope of the upper surface and/or the lower surface of the single layer (where thickness is reduced because of a steep slope, then the profile is corrected).

In embodiments, geometry construction comprises sweeping cell profiles along the outline of their cells. This can create closed body cells which are subtracted from the main protector body or used to generate individual cells by adding thickness to the profile (as shown by FIGS. 4F and 4E).

In embodiments, geometry construction comprises measuring or estimating the volume and weight of the resulting protective item.

The process can be repeated and iterated to optimize overall weight, performance, transmitted load, surface area, appeal, and comfort.

FIGS. 10A-10D depict iteration examples of a shoulder pad for ice hockey players according to embodiments.

Figure 10A:
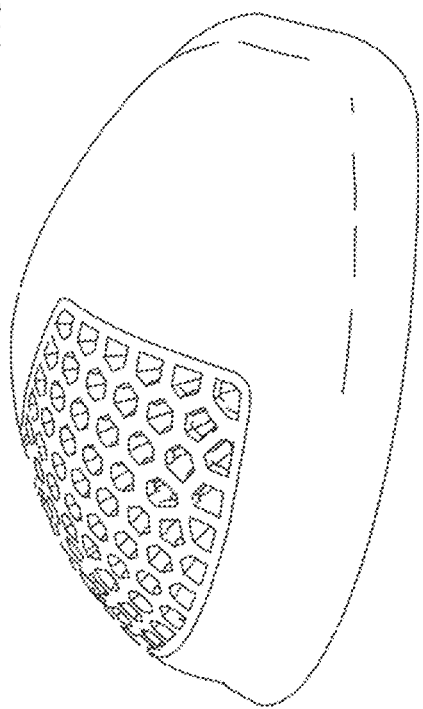
FIGS. 10A-10D depict iteration examples of a shoulder pad for ice hockey.
Figure 10B:
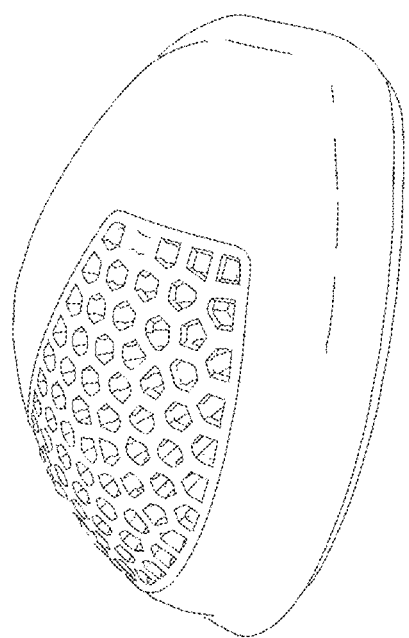
Figure 10C:
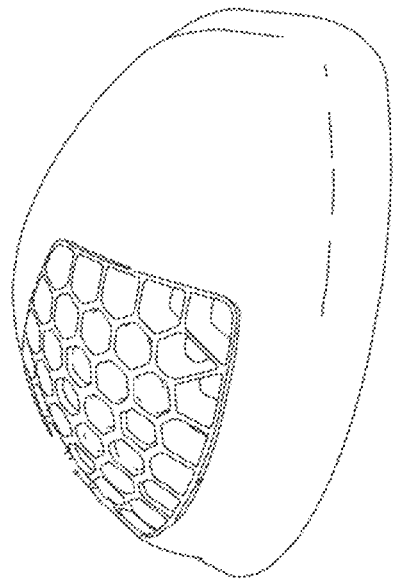
Figure 10D:
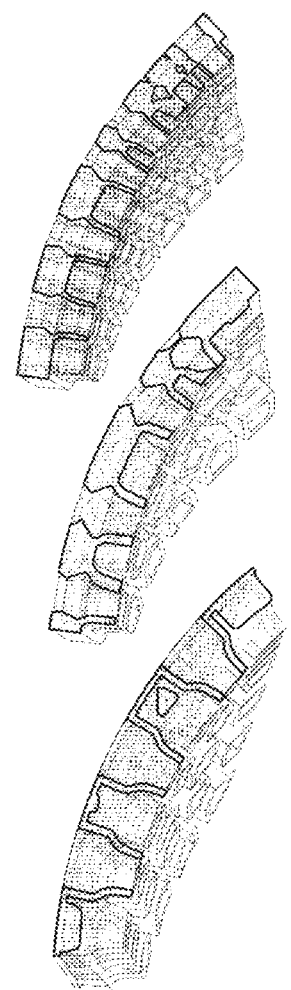

The parameters for the iteration depicted in FIG. 10A are as follows:

Internal cell ratio, the cell profile can change such that it is hard on one side and grows softer on the other side (as shown in FIG. 10D). The height at which the cell becomes soft determines the overall feel of the part. That is, mostly hard, or soft or an even split between the two.

| | |
|---|---|
| Soft/hard ratio: | 50/50 |
| Weight: | 103 g |
| Thickness: | 15 mm |
| Estimated impact protection improvement at 50 J: | 45% |
| Surface area: | 9,669 mm$^2$ |
| Cell diameter: | 11 mm |

The parameters for the iteration depicted in FIG. 10B are as follows:

| | |
|---|---|
| Soft/hard ratio: | 50/50 |
| Weight: | 98 g |
| Thickness: | 15 mm |
| Estimated impact protection improvement at 50 J: | 45% |
| Surface area: | 7,767 mm$^2$ |
| Cell diameter: | 11 mm |

The parameters for the iteration depicted in FIG. 10C are as follows:

| | |
|---|---|
| Soft/hard ratio: | 50/50, transitioning from pin to extrusion |

| | |
|---|---|
| Weight: | 75 g |
| Thickness | 15 mm |
| Estimated impact protection improvement at 50 J: | 30% |
| Surface area: | 7,767 mm² |
| Cell diameter: | 13.5 mm |

Embodiments comprise measures for designing and/or manufacturing an anatomical protective item for one or more users, the anatomical protective item comprising a single layer of energy controlling cells. The measures comprise obtaining input data associated with one or more users, processing the obtained input data to identify one or more energy controlling criteria for the anatomical protective item, and employing a packing process and/or a tessellation process to generate each energy controlling cell in the single layer. Each energy controlling cell comprises one or more walls which extend from an upper surface of the single layer to a lower surface of the single layer. One or more of the packing process and the tessellation process performed at least on the basis of the identified one or more energy controlling criteria.

Embodiments comprise one or more anatomical protective items manufactured according to any of the methods described above.

The anatomical protective item may comprise a tensile layer. The anatomical protective item may comprise an elastomeric material. The anatomical protective item may comprise a strain rate sensitive material. The anatomical protective item may comprise body armor. The anatomical protective item may comprise a helmet. The anatomical protective item may for example comprise one or more of a glove, a footbed of a shoe (e.g. insole or midsole), a foot upper (e.g. upper part of a shoe above the footbed), a saddle (for example a bicycle or horse saddle), a vehicle seat, a recoil pad, an item of clothing, and a brassiere.

Embodiments comprise a computer program product comprising a set of instructions, which, when executed by a computerized device, cause the computerized device to perform a method of designing an anatomical protective item for one or more users, the anatomical protective item comprising a single layer of energy controlling cells, the method comprising: obtaining input data associated with one or more users; processing the obtained input data to identify one or more energy controlling criteria for the anatomical protective item; and employing a packing process and a tessellation process to generate each energy controlling cell in the single layer, wherein each energy controlling cell comprises one or more walls which extend from an upper surface of the single layer to a lower surface of the single layer, wherein one or more of the packing process and the tessellation process is performed at least on the basis of the identified one or more energy controlling criteria. Embodiments comprise manufacturing the anatomical protective item comprising the single layer of energy controlling cells.

Embodiments comprise a computer program product comprising a set of instructions, which, when executed by a computerized device, cause the computerized device to perform a method of optimizing the design of an anatomical protective item for one or more users, the anatomical protective item comprising a single layer of energy controlling cells, the method comprising: receiving input data associated one or more users; processing the obtained input data to identify one or more energy controlling criteria for the anatomical protective item; iterating a packing process to generate each energy controlling cell in the single layer, wherein each energy controlling cell comprises one or more walls which extend from an upper surface of the single layer to a lower surface of the single layer, wherein the packing process is performed at least on the basis of the identified one or more energy controlling criteria; and outputting data defining a design of the anatomical protective item comprising the single layer of energy controlling cells.

In embodiments, more than a single layer of energy controlling cells are employed.

Embodiments comprise a computer program product comprising a set of instructions, which, when executed by a computerized device, cause the computerized device to perform a method of optimizing the design of an anatomical protective item for one or more users, the anatomical protective item comprising a plurality of energy controlling cells, the method comprising: receiving input data associated one or more users; processing the obtained input data to identify one or more energy controlling criteria for the anatomical protective item; iterating a packing process to generate each energy controlling cell in the plurality, wherein each energy controlling cell comprises one or more walls which extend from an upper surface to a lower surface, wherein the packing process is performed at least on the basis of the identified one or more energy controlling criteria; and outputting data defining a design of the anatomical protective item comprising the plurality of energy controlling cells. The plurality of cells may for example be generated in multiple layers of cells.

Where in the foregoing description, integers or elements are mentioned which have known, obvious or foreseeable alternatives or equivalents, then such alternatives or equivalents are herein incorporated as if individually set forth. Reference should be made to the claims for determining the true scope of the present disclosure, which should be construed so as to encompass any such alternatives. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments, may not be desirable, and may therefore be absent, in other embodiments.

What is claimed is:

1. A method of manufacturing an anatomical protective item for one or more users, the anatomical protective item comprising a single layer of energy controlling cells, the method comprising:
   obtaining input data associated with one or more users;
   processing the obtained input data to identify one or more energy controlling criteria for the anatomical protective item;
   employing a packing process to generate each energy controlling cell in the single layer of energy controlling cells, wherein:
      each energy controlling cell comprises one or more walls which extend from an upper surface of the single layer to a lower surface of the single layer, and
      the packing process is performed at least based on the identified one or more energy controlling criteria; and
   manufacturing the anatomical protective item comprising the single layer of energy controlling cells.

2. The method according to claim 1, wherein each energy controlling cell is orientated between the upper surface and the lower surface along a respective axis, and the packing process allocates a center point for each energy controlling cell through which its axis passes.

3. The method according to claim 1, further comprising employing a surface tessellation process to determine a position of the one or more walls of each energy controlling cell.

4. The method according to claim 3, wherein the surface tessellation process performs a trade-off between an overall weight of the anatomical protective item and the energy controlling performance of the energy controlling cells of the anatomical protective item.

5. The method according to claim 3, wherein the surface tessellation process comprises a Voronoi tessellation process.

6. The method according to claim 5, wherein the Voronoi tessellation process comprises a weighted centroidal Voronoi tessellation process, wherein:
one or more energy controlling cells comprise a uniform shape; and
one or more energy controlling cells comprise a different shape dependent on weightings associated with the one or more energy controlling criteria.

7. The method according to claim 1, further comprising employing a surface tessellation process to determine an orientation of the one or more walls of each energy controlling cell.

8. The method according to claim 1, wherein one or more of the energy controlling cells comprise an internal cell wall re-entrant geometry.

9. The method according to claim 1, wherein:
one or more of the energy controlling cells comprise a first internal cell wall re-entrant geometry,
one or more other of the energy controlling cells comprise a second internal cell wall re-entrant geometry, and
the second internal cell wall re-entrant geometry is more re-entrant than the first internal cell wall re-entrant geometry.

10. The method according to claim 9, wherein:
the one or more energy controlling criteria define weightings for the energy controlling cells,
a relatively high weighting for an energy controlling cell is associated with a relatively high level of protection of a body part of a user from impact on the respective energy controlling cell of the anatomical protective item,
a relatively low weighting for an energy controlling cell is associated with a relatively low level of protection of a body part of a user from impact on the respective energy controlling cell of the anatomical protective item,
the second internal cell wall re-entrant geometry is allocated to energy controlling cells with the relatively high weighting, and
the first internal cell wall re-entrant geometry is allocated to energy controlling cells with the relatively low weighting.

11. The method according to claim 1, wherein:
the one or more energy controlling criteria define weightings for the energy controlling cells,
a relatively high weighting for an energy controlling cell is associated with a relatively high level of protection of a body part of a user from impact on the respective energy controlling cell of the anatomical protective item, and
a relatively low weighting for an energy controlling cell is associated with a relatively low level of protection of a body part of a user from impact on the respective energy controlling cell of the anatomical protective item.

12. The method according to claim 1, wherein the obtained input data comprises one or more of:
medical imaging data,
anthropometry data,
pressure mapping data,
motion tracking data, and
digital image correlation data.

13. The method according to claim 1, wherein the processing comprises analyzing the obtained input data to make one or more measurements of one or more anatomic structures in one or more possible impact areas of anatomies of the one or more users.

14. The method according to claim 13, wherein the one or more measurements are related to at least one of:
a thickness of bone and soft tissue,
a distance between bone and skin surface,
a posture during impact,
a direction of impact, or
a known injury location or area.

15. The method according to claim 1, wherein the processing comprises interpolating the obtained input data to generate a three-dimensional intensity map around a predetermined body part or parts of the one or more users, the three-dimensional intensity map defining one or more of:
one or more zones having different energy control performances,
thickness between the upper surface of the single layer and the lower surface of the single layer, and
overall shape or outline of the anatomical protective item.

16. The method according to claim 1, wherein the processing comprises interpolating the obtained input data to generate a three-dimensional intensity map of distances between vertices of tissue mesh and bone mesh of the one or more users.

17. The method according to claim 1, wherein at least one of the cells comprises an opening at one or more of the upper surface and the lower surface of the single layer.

18. The method according to claim 1, wherein the manufacturing comprises one or more of an injection molding process and an additive manufacturing process.

19. The method according to claim 1, wherein the input data is associated with a single user such that the anatomical protective item is manufactured for use by the single user.

20. The method according to claim 1, wherein the input data is associated with a plurality of users of a given type such that the anatomical protective item is manufactured for use by multiple users of the given type.

21. An apparatus for use in manufacturing an anatomical protective item for one or more users, the anatomical protective item comprising a single layer of energy controlling cells, the apparatus comprising:
at least one memory including computer program code,
at least one processor configured to execute the computer program code and cause the apparatus to:
obtain input data associated with one or more users;
process the obtained input data to identify one or more energy controlling criteria for the anatomical protective item;
employ a packing process to generate each energy controlling cell in the single layer of energy controlling cells, wherein:

each energy controlling cell comprises one or more walls which extend from an upper surface of the single layer to a lower surface of the single layer, and the packing process is performed at least based on the identified one or more energy controlling criteria; and manufacture the anatomical protective item comprising the single layer of energy controlling cells.

22. A computer program product comprising a non-transitory computer-readable storage medium having computer-readable instructions stored thereon, the computer-readable instructions being executable by a computerized device to cause the computerized device to perform a method of manufacturing an anatomical protective item for one or more users, the anatomical protective item comprising a single layer of energy controlling cells, the method comprising:

obtaining input data associated with one or more users;

processing the obtained input data to identify one or more energy controlling criteria for the anatomical protective item;

employing a packing process to generate each energy controlling cell in the single layer of energy controlling cells, wherein:

each energy controlling cell comprises one or more walls which extend from an upper surface of the single layer to a lower surface of the single layer, and the packing process is performed at least on the basis of the identified one or more energy controlling criteria; and manufacturing the anatomical protective item comprising the single layer of energy controlling cells.

* * * * *